Feb. 9, 1960   C. R. NICHOLS   2,924,076
METHOD OF AND APPARATUS FOR ROTATING A CRANK SHAFT
Filed Jan. 21, 1955   14 Sheets-Sheet 2

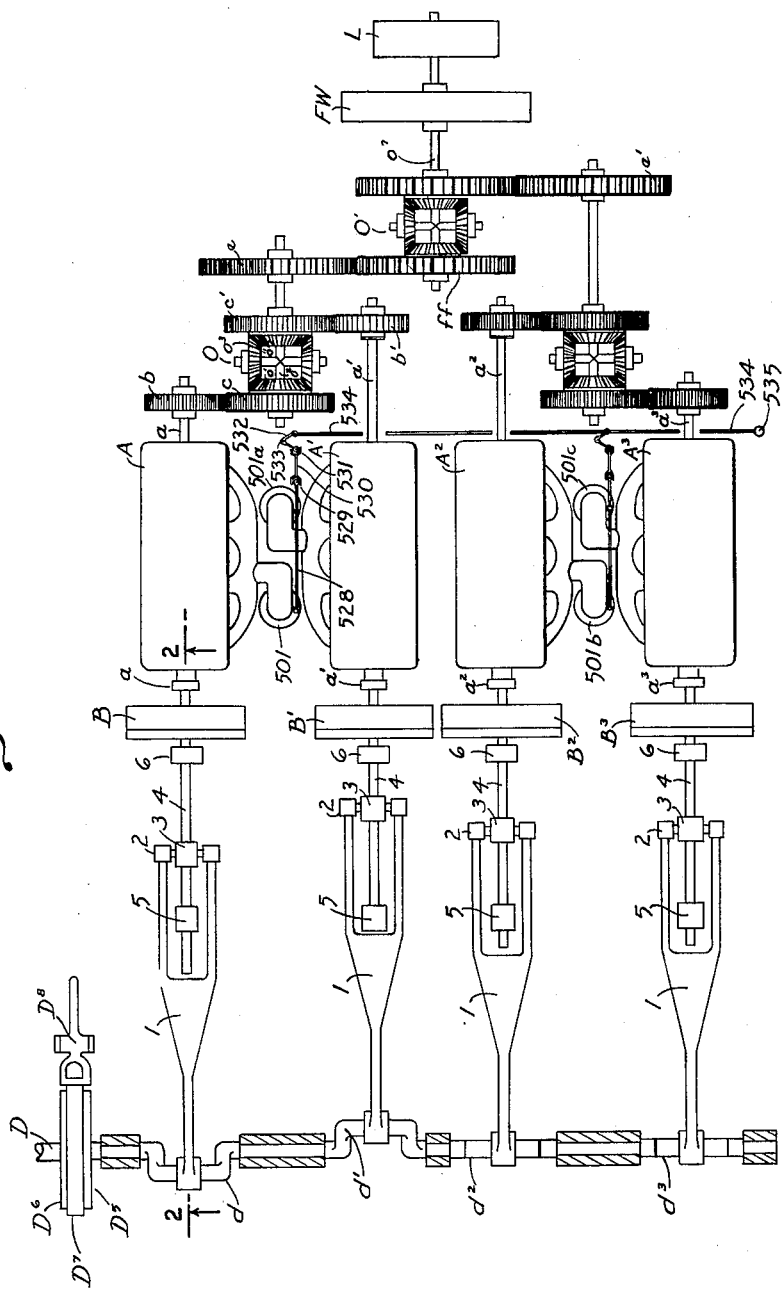

*INVENTOR.*
CHARLES R. NICHOLS

INVENTOR.
CHARLES R. NICHOLS

INVENTOR.
CHARLES R. NICHOLS

Feb. 9, 1960   C. R. NICHOLS   2,924,076
METHOD OF AND APPARATUS FOR ROTATING A CRANK SHAFT
Filed Jan. 21, 1955   14 Sheets-Sheet 5
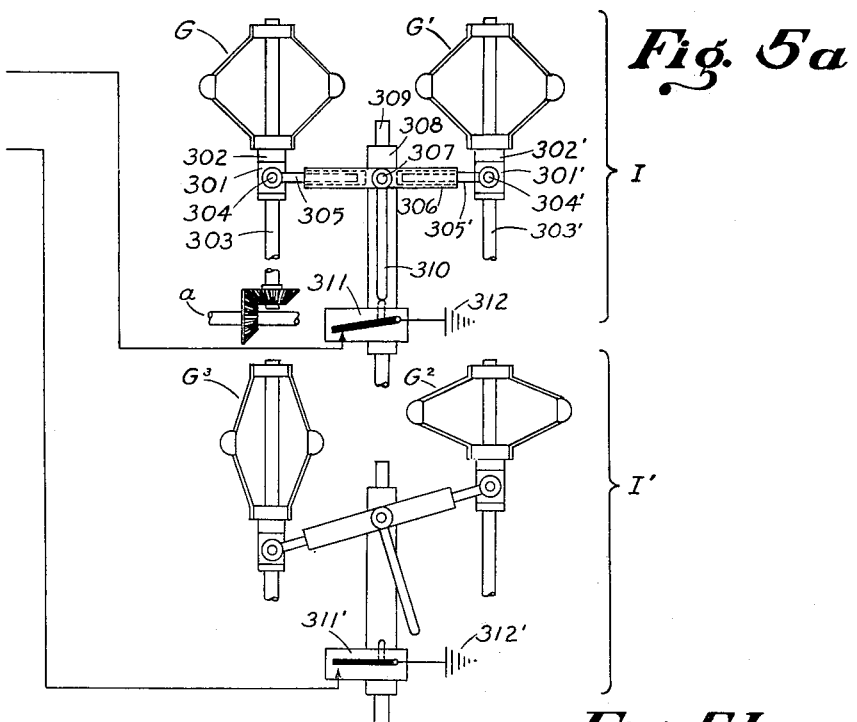
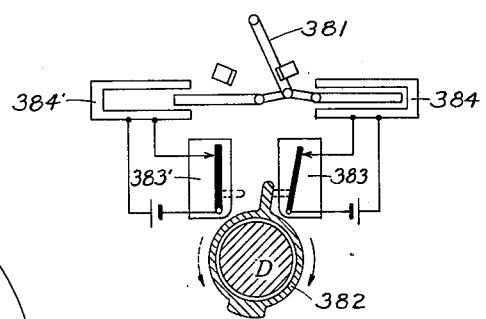
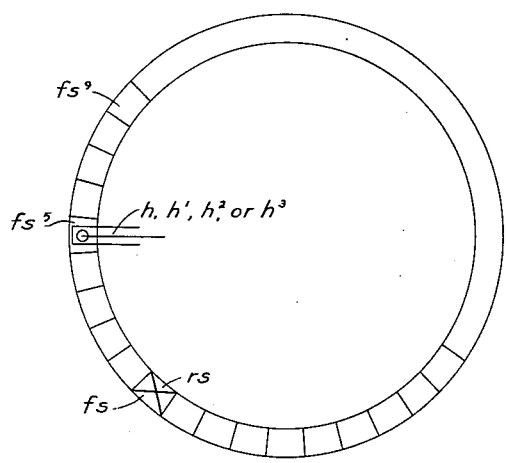
INVENTOR.
CHARLES R. NICHOLS

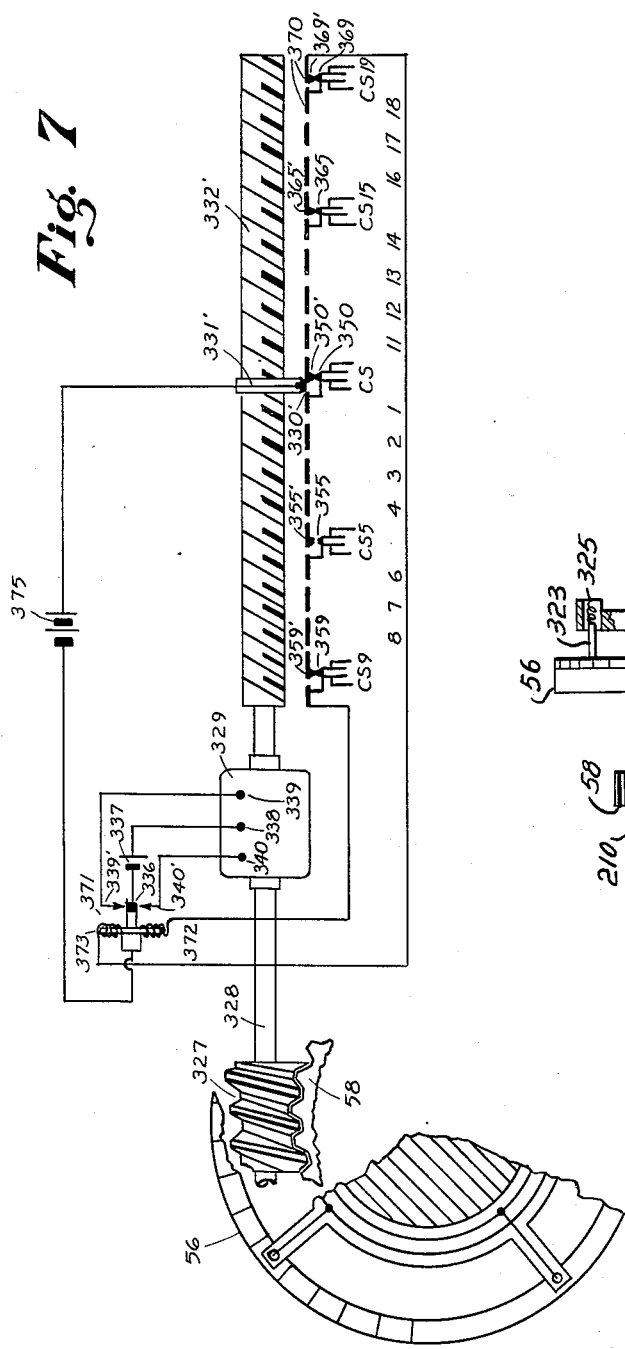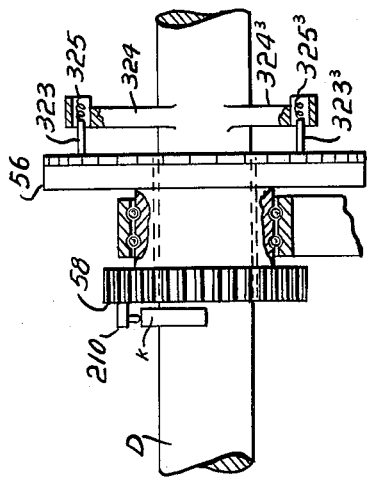

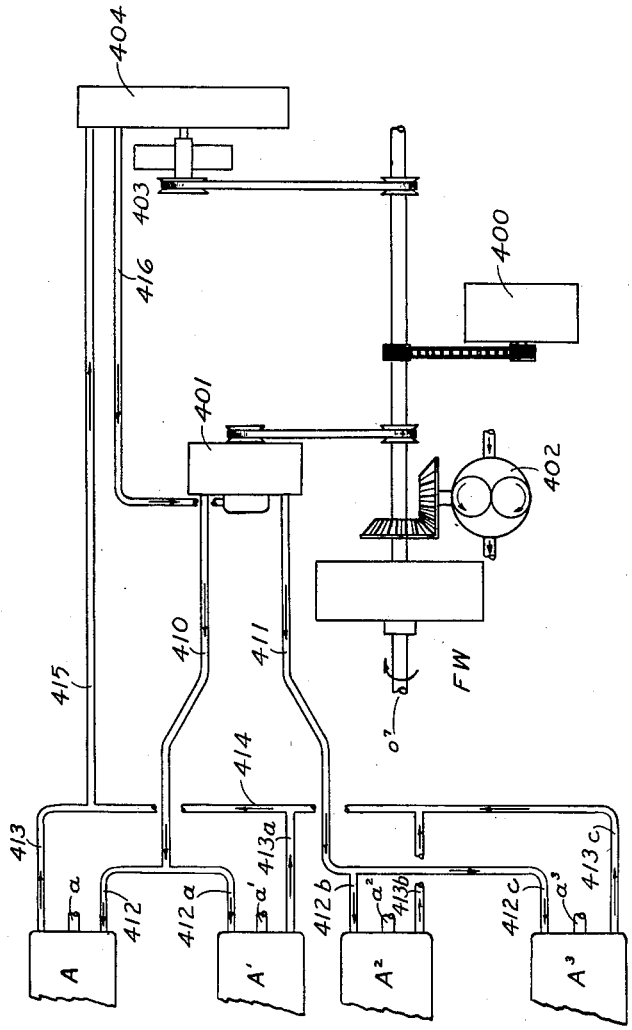

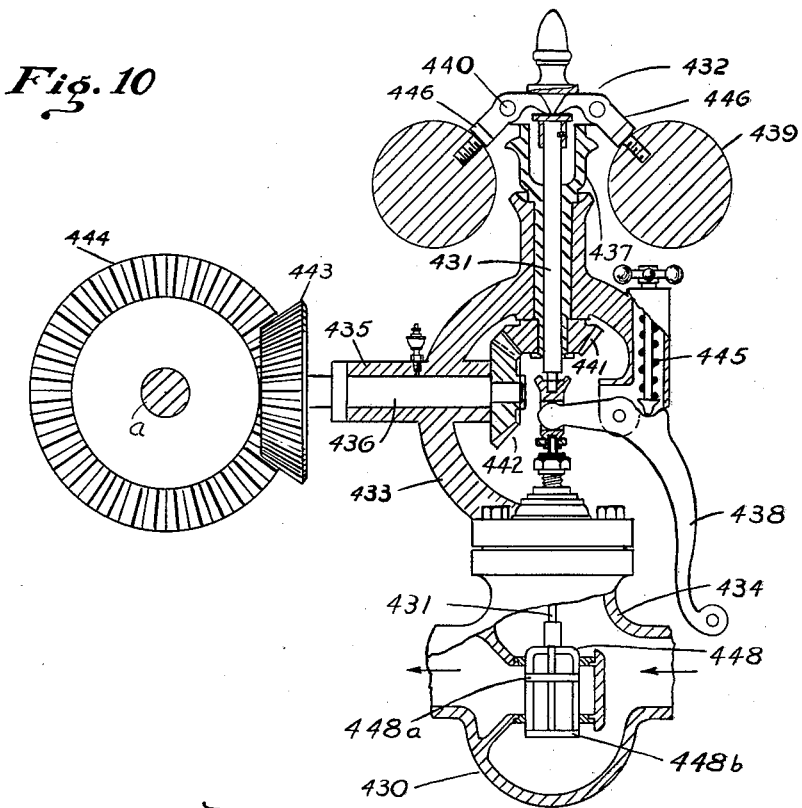
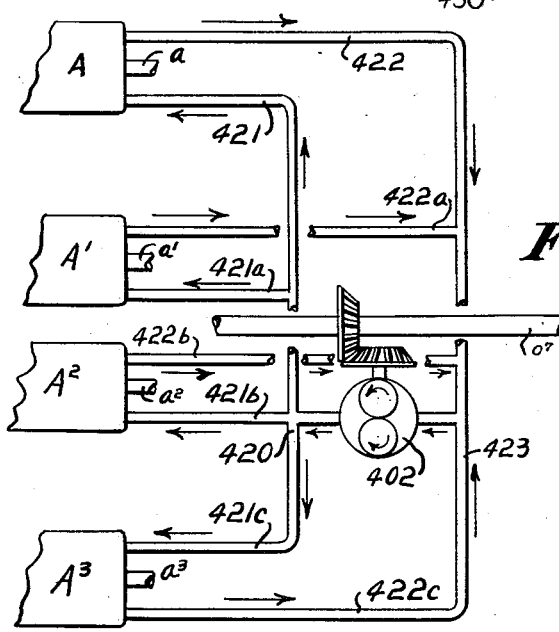

Feb. 9, 1960 C. R. NICHOLS 2,924,076
METHOD OF AND APPARATUS FOR ROTATING A CRANK SHAFT
Filed Jan. 21, 1955 14 Sheets-Sheet 9

INVENTOR.
CHARLES R. NICHOLS

INVENTOR.
CHARLES R. NICHOLS

Feb. 9, 1960 C. R. NICHOLS 2,924,076
METHOD OF AND APPARATUS FOR ROTATING A CRANK SHAFT
Filed Jan. 21, 1955 14 Sheets-Sheet 11

INVENTOR.
CHARLES R. NICHOLS

Feb. 9, 1960          C. R. NICHOLS          2,924,076
METHOD OF AND APPARATUS FOR ROTATING A CRANK SHAFT
Filed Jan. 21, 1955          14 Sheets-Sheet 12

INVENTOR.
CHARLES R. NICHOLS

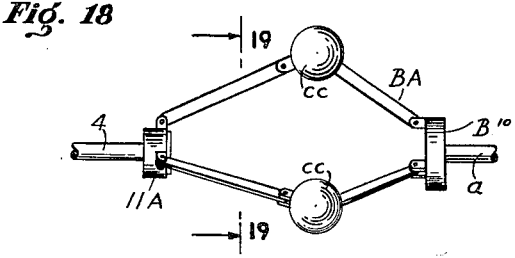
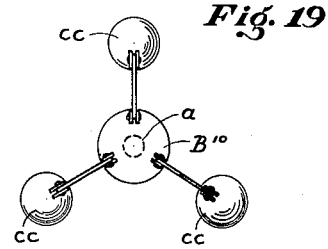
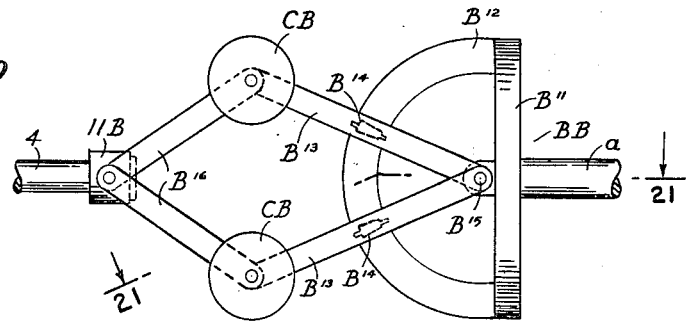
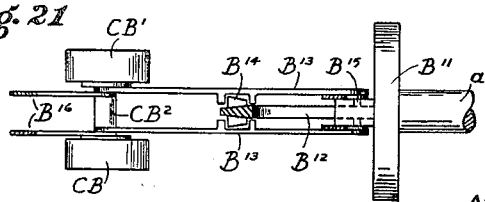
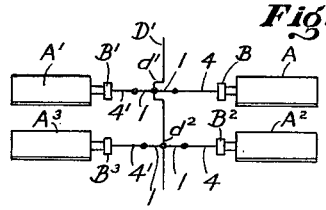
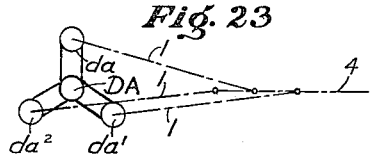
*INVENTOR.*
CHARLES R. NICHOLS Feb. 9, 1960  C. R. NICHOLS  2,924,076
METHOD OF AND APPARATUS FOR ROTATING A CRANK SHAFT
Filed Jan. 21, 1955  14 Sheets-Sheet 14

INVENTOR
CHARLES R. NICHOLS
BY Hubbell and Cohen
ATTORNEYS.

2,924,076
Patented Feb. 9, 1960

2,924,076

METHOD OF AND APPARATUS FOR ROTATING A CRANK SHAFT

Charles R. Nichols, McAllen, Tex.

Application January 21, 1955, Serial No. 483,277

30 Claims. (Cl. 60—97)

The general object of the present invention is to provide a novel method and novel apparatus for rotating a crank shaft at varying speeds and under varying loads. The invention comprises a variable speed power unit of novel type and including one or more engines adapted to rotate at a relatively high speed and thereby rotate a power output crank shaft at variable speeds, at least some of which are much lower than the normal engine speeds. Each of said engines may well be a four-cycle gas engine, a diesel engine or other known form of internal combustion engine. My invention is well adapted for a wide range of uses. It may be used, for example, in driving automobiles, buses, military tanks, Caterpillar tractors, locomotives, boats, well drilling apparatus, hoisting mechanism, and for other purposes, and is especially well adapted for rotating an output shaft carrying a load varying widely in its speed and torque requirements.

A more specific primary object of the invention is to provide a power unit comprising a variable speed output crank shaft, one or more driving shafts normally rotating at an average speed higher than the speed of rotation of the output shaft, a separate link of variable length connecting each driving shaft to a crank portion of said output shaft and automatically elongating and contracting during each revolution of the output shaft as required to subject said crank portion to a variable unidirectional tension force tending to maintain the output shaft in rotation during one portion of each revolution thereof and opposing the rotation of said output shaft during another portion of said revolution. A separate engine is connected to and maintains each driving shaft in rotation by subjecting it to a driving torque varying during each revolution of said output shaft so as to make the tension force transmitted from said driving shaft to one of said output shaft crank portions greater during said one portion than during said second portion of each revolution of the output shaft.

In the form of my improved power unit which I now consider preferable, each link of variable length included in the unit comprises a flywheel which is connected to and rotated by a corresponding one of said driving shafts and which includes two or more weights distributed about the axis of rotation of the flywheel. Those weights are moved toward said axis by the corresponding tension force and thereby elongate said link, and are moved away from said axis by the centrifugal forces acting on said weights and thereby shorten said link. The centrifugal forces continuously maintain said tension force while the weights are being rotated.

Specific objects of the invention include the provision of simple and effective means for varying the individual engine speeds (r.p.m.'s), and thereby varying the speeds (r.p.m.'s) of the corresponding driving shafts and flywheels during each revolution of said output shaft so as to make the tension force transmitted from each of said driving shafts to its corresponding said output shaft crank portion greater during said one portion of each revolution of said output shaft than during said second portion of each revolution of said output shaft and thereby rotating or tending to rotate said output shaft. This varying or control of the individual engine speeds (r.p.m.'s) is accomplished by simple and effective means for controlling the ignition circuits of the individual engines so as to provide accelerating or working periods and decelerating or loafing periods for each of the individual engines and includes means for adjusting the relative times at which accelerating or working periods and decelerating or loafing periods are initiated and terminated for each of the individual engines as required for efficient operation under varying speed and load conditions.

Another specific object of the invention is to provide alternative simple and effective means for varying the individual engine speeds (r.p.m.'s) for the above indicated purposes by controlling the timing of valves controlling the supply of fuel to the various engines.

Specific objects of the invention also include the provision of simple and effective means for increasing the rate of deceleration of each of the engines by coupling the said driving shafts or crank shafts of the individual engines by means of differential gearing in such fashion that when one of the engines is accelerated it will forcibly tend to decelerate at least one of the other engines; thereby increasing the efficiency of my improved power unit and improving the operating characteristics.

The apparatus used in the practice of the invention may take a wide variety of forms, some of which are hereinafter described and illustrated. Thus, for example, in some cases the mass of each engine driven flywheel may consist mainly of material which remains in fixed position relative to the flywheel axis when in rotation, while in other cases the mass of the flywheel may consist mainly of its movable weights and the mechanical linkage for moving the weights toward and away from the flywheel axis. Also, for example, in some cases control of the variation of the individual engine speeds (r.p.m.'s) is accomplished by controlling the ignition circuits of the individual engines; while in other cases control of the variation of the individual engine speeds (r.p.m.'s) is accomplished by controlling valves controlling the supply of fuel to the various engines. In some cases, the valves employed in one form to vary or cut off the supply of fuel to each engine during a portion of each output shaft revolution, may be wholly operated through mechanical connections to the driven or output shaft, and in other cases the valve operating means may be wholly or largely of an electrical character.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described various embodiments of the invention:

Fig. 1 is a diagrammatic plan view of a power unit.

Fig. 5a is part of the diagrammatic view partly shown in Fig. 5.

Fig. 5b is part of the diagrammatic view partly shown in Fig. 5.

Fig. 5c is a diagram illustrating a position detail of part of the apparatus of Fig. 5.

Fig. 6 is an elevation, with parts sectionalized on the line 6—6 of Fig. 5.

Fig. 7 is a diagrammatic view illustrating alternative apparatus for governing time of initiation of accelerating periods and decelerating periods of the individual engines.

Fig. 8 is a diagram showing the component parts of the load L of Fig. 1, and diagrammaticalily illustrating the water cooling system of the power plant.

Fig. 9 is a diagrammatic view illustrating the lubricating or oiling system of the power plant.

Fig. 10 is a vertical section and partial elevation of a throttle valve controlled by a flyball governor.

Fig. 18 is an elevation of a modified flywheel construction.

Fig. 19 is a section on the line 19—19 of Fig. 18.

Fig. 20 is an elevation of a third flywheel form.

Fig. 21 is a section on the line 21—21 of Fig. 20.

Fig. 22 is a diagrammatic plan view illustrating a modification of the power units shown in Figs. 1 and 11.

Fig. 23 is a diagrammatic plan view illustrating another modification of the power units shown in Figs. 1 and 11.

Reference is also made herewith to my pending application, Serial No. 79,381, filed March 3, 1949, allowed April 28, 1954 and now abandoned.

Figure 1A:
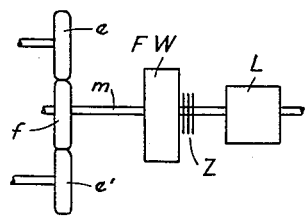
Fig. 1a is a diagrammatic plan view forming a part of the plan view of Fig. 1 in an optional arrangement.

In Figs. 1, 1a, 2, 3, 4, 4a, 5, 5a, 5b, 5c, 6 and 7, of the accompanying drawings, I have illustrated, by way of example, an embodiment of the present invention in a power unit comprising four engines A, A', A² and A³. Each of said engines includes a rotating shaft $a$, $a'$, $a^2$ and $a^3$, which is respectively secured to and rotates a separate flywheel B, B', B² or B³. The flywheel B, in the form shown by way of example in Fig. 2, comprises a rigid hollow body of cylindrical form in which diametrically opposed weights C and C' are mounted for movement toward and away from the flywheel axis. Each of the wheels B', B² and B³ may be a replica of the flywheel B. The power unit also comprises as shown in Fig. 1, an output shaft D which is transverse to and intersected by the axes of the different flywheels, and is formed with separate crank portions $d$, $d'$, $d^2$ and $d^3$. The crank portions $d$, $d'$, $d^2$ and $d^3$ are respectively connected to the flywheels B, B', B² and B² in such manner that each of the flywheel weights C and C' is moved toward the axis of the corresponding flywheel during one portion, and is permitted to move away from said axis during another portion of each rotation of the output shaft D.

Figure 2:
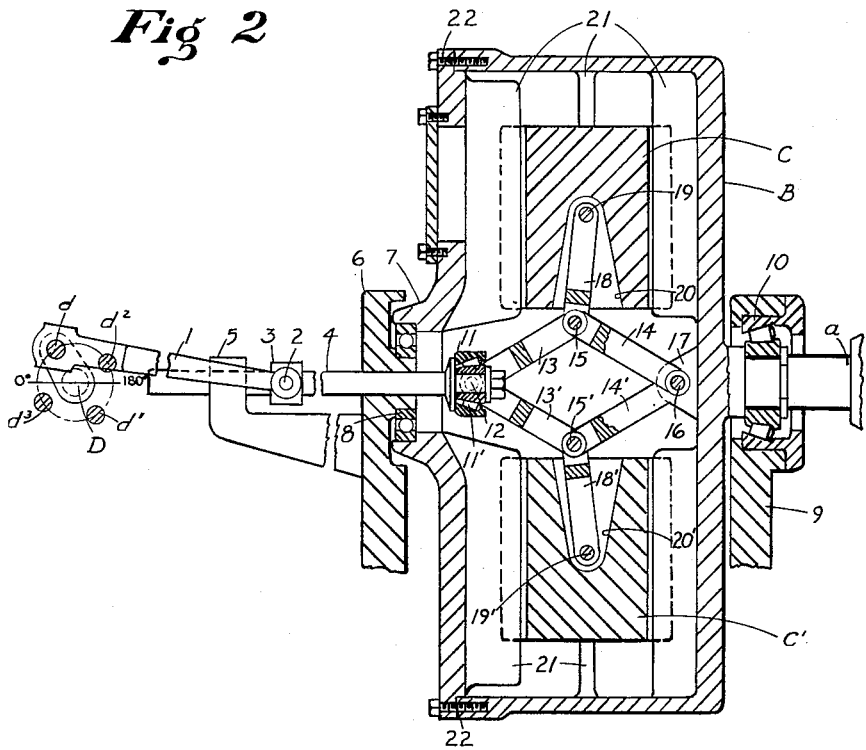
Fig. 2 is a large scale section on the line 2—2 of Fig. 1.

As is shown in Fig. 2, the means connecting the crank portion $d$ to the corresponding flywheel B comprises a connecting rod 1, pivotally connected at one end to the crank portion and having its other end connected to trunnion pivots 2 carried by a collar and in line with the axis of the flywheel B. The bar 4 is mounted for longitudinal movement in portions 5 and 6 of the supporting framework for the power unit. As shown the body of the flywheel B comprises a hub portion 7 at its side adjacent the shaft D, which is journalled in the framework portion 6 by means of a ball bearing 8 which may be of conventional type. At its other side the body of the flywheel B is rigidly connected to the coaxial shaft $a$ of the engine A, and is journalled in a supporting frame portion 9 by means of a roller bearing 10. The latter is shown as a conventional type thrust bearing, and is operative to prevent movement of the body of the flywheel B toward the output shaft D.

The end of the bar 4 remote from the shaft D extends into the hollow central portion of the body of the flywheel B. A collar 11 is swiveled on the cylindrical inner end of the bar 4 by means of a roller bearing 11'. The latter is shown as a conventional type thrust bearing, and is operative to transmit and support the tension forces continuously although variably maintained while the weights are being rotated, as well as to permit rotation of collar 11 relative to the cylindrical inner end of the bar 4. The latter is not intended to rotate relative to the supports 5 and 6 through which it passes, and its body portion need not be circular in cross section. The collar 11 is provided with trunnion pivots 12 through which the bar 4 is pivotally connected to one end of each of a pair of diverging links 13 and 13'. The second end of the link 13 is connected by a pivot 15 to one end of a link 14 which has its other end connected by a pivot pin 16 to a bracket 17 attached to the side wall of the flywheel body remote from the shaft D. The end of the link 13' remote from the collar 11 is connected by a pivot 15' to the end of a link 14' which also has its second end pivotally connected to the pivot pin 16. The connected ends of the links 13 and 14 are connected by the pivot 15 to one end of a link 18 which has its other end pivotally connected by a pivot 19 to the weight C. Similarly the links 13' and 14' are connected by the pivot 15', link 18' and pivot 19' to the weight C'. The weight C is formed with a tapered well or cavity 20 which is open at its inner end to receive the link 19. The weight C' is formed with a similar well or cavity 20'.

As shown in Fig. 2, weights C and C' are mounted in aligned guideways 21 in the hollow body of the flywheel B for radial movement toward and away from the axis of the flywheel. The interconnecting linkage between the longitudinally movable draw bar 4 and the flywheel weights C and C', is so proportioned and arranged that the pivots 15 and 15' are at all times laterally displaced in opposite directions from the axis of the flywheel. The pivotally connected links 13, 13', 14 and 14' thus form a toggle like connection between the collar 11 and bracket 17. When the crank portion $d$ is moving about the axis of shaft D through the 180° arc in which said crank portion is moving toward the flywheel, each of the weights C and C' is moving away from the flywheel axis. In consequence the angles between the links 13 and 13' and between the links 14 and 14' are then becoming larger. During the 180° arc movement of the crank portion $d$ in which the latter is moving away from the flywheel B, the weights C and C' are moving toward the flywheel axis, and the above mentioned link angles are then becoming smaller. Whenever the flywheel is rotating the centrifugal forces acting on the weights C and C' subject the links 13 and 13' to tension and thereby continuously subject the draw bar 4 to a pull, or tension force. In consequence, the draw bar 4 connected to the flywheel B, continuously pulls on the crank portion $d$ through the connecting rod 1, while B is in rotation at an operative speed. As shown, the side wall of the hollow body of the flywheel B nearest to the shaft D contains hand holes—and is detachably connected to the body of the flywheel by screws 22, thus permitting the flywheel body to be opened up and otherwise facilitating the assembly, inspection and repairs of the parts mounted in the flywheel.

The flywheels $B'$, $B^2$ and $B^3$ are each connected to and pull on the respective crank portion $d'$, $d^2$ or $d^3$, just as the flywheel B is connected to and pulls on the crank portion $d$. The crank portions $d$, $d'$, $d^2$ and $d^3$ are not only displaced longitudinally of the shaft D, but are advantageously spaced at 90° angular intervals about the axis of the shaft. In the arrangement shown in Fig. 1, the crank portions $d$ and $d'$ are displaced 180° from one another. The crank portions $d^2$ and $d^3$ are also displaced 180° from one another, and each is displaced 90° from each of the crank portions $d$ and $d'$. As seen in Fig. 2, the crank portion $d^2$ is displaced 90° in the clockwise direction from the crank portion $d$ and the crank portion $d^3$ is displaced 90° in the clockwise direction from the crank portion $d'$.

As is hereinafter explained, in ordinary operation each of the engines A, A', $A^2$ and $A^3$ usually makes a plurality of revolutions for each revolution of the output shaft D, and the ignition circuit of each engine is regulated to make the average rotative speed of the engine greater during the half-revolutions of the shaft D in which the crank portion $d$, $d'$, $d^2$ or $d^3$ connected to that engine is moving toward the corresponding flywheel than during the half-revolutions of said output shaft in which said crank portion is moving away from the corresponding flywheel. Thus, the tension force transmitted from each of the engines A, A', $A^2$ and $A^3$ to its corresponding output shaft crank portion $d$, $d'$, $d^2$ and $d^3$ is greater during the half-revolutions of the shaft D in which the respective crank portion $d$, $d'$, $d^2$ or $d^3$ is moving toward the corresponding flywheel B, B', $B^2$ or $B^3$ than during the half-revolutions of said output shaft in which said crank portion is moving away from the corresponding flywheel. The speed variations of the different engines are not in phase with one another.

The object of the system of differential gear trains and associated load and inertia illustrated in Fig. 1, is to provide a high degree of positive control of the deceleration of each of the engines A, A', $A^2$ and $A^3$ (and their respective flywheels B, B', $B^2$ and $B^3$) by coupling the crank shafts of the engines by means of differential gearing in such fashion that when one of the engines of a pair (a pair may be defined as the two engines of which the respective accelerating or working periods and decelerating or loafing periods are 180° out of phase by virtue of the phase relationship of their respective crank arms of the output shaft D, and the relationship of the engine positions) is accelerated, it will forcibly tend to decelerate the other engine of the pair by virtue of the load and inertia which is imposed on the main shaft of the differential gearing by means of which the two engines are coupled. A pair may be thus coupled independently of the other pair (or another pair) which is also similarly coupled or more advantageously the two pairs may themselves be interdependent by virtue of a third differential gear train coupling the main shafts of the differential gears which respectively couple the engines of each of the two pairs. In this latter case, the load and inertia are applied to the main shaft of this third differential gear train rather than to the main shafts of the differential gear train which respectively couple the engines of each pair. (An alternative relationship is described later.)

The load that is to be carried by the main shaft of the differential gear train or trains is composed of generator and/or water pump and/or oil pump and/or cooling fan loads. In Fig. 1, this load is diagrammatically shown as load L applied to the shaft $o^7$. This relationship is illustrated in more detail in Fig. 8 and described later. For the moment it is sufficient to note that the individual generator, water pump, oil pump, and cooling fan ordinarily integral with an individual engine are respectively replaced as illustrated in Fig. 8 by a single generator, single water pump, single oil pump, and single cooling fan, each serving all of the engines and each driven by a single shaft, for example, the main shaft $o^7$ of the differential gear train O'. In addition, a flywheel FW, Fig. 1, may be attached to the main shaft of the differential gear to give it a larger moment of inertia. Said flywheel may be fixed integrally with the main shaft $o^7$ of the differential gear or it may be coupled to this shaft by means of a clutch, for example Z, Fig. 1a, thus permitting it to be either used or dispensed with under certain selective operating conditions. (For example; unclutched when starting engines.)

More specifically, and in detail, consider Fig. 1 in which $a$ represents the main shaft of the engine A. Similarly, $a'$, $a^2$ and $a^3$ represent the respective main shafts of the other engines A', $A^2$ and $A^3$. The two shafts $a$ and $a'$ are separately connected to the two aligned bevel driving gears $o'$ and $o''$ of a differential mechanism O including a rotatable driving element $o^2$ which is coaxial with said bevel gears. The element $o^2$ supports one or more bevel gears $o^3$ meshing with each of the gears $o'$ and $o''$ and each rotating about an axis radial to the axis of rotation of the element O.

$b$ is a spur gear coaxial with and integral with the shaft $a$ and meshes with the spur gear $c$ which is coaxial with and integral with the bevel driving gear $o'$. Similarly $b'$ is a spur gear coaxial with and integral with the shaft $a'$ and meshes with the spur gear $c'$ which is coaxial with and integral with the bevel gear $o''$. Thus, it will be apparent that with the direction of rotation as indicated in Fig. 1 for the shafts $a$ and $a'$ then the shaft $o^2$ of the driving element O will be rotated in the direction indicated.

The spur gear $e$ is coaxially and integrally fixed to the shaft $o^2$ of the driving element O.

Thus, it will be apparent that when shaft $a$ and $a'$ are rotating in the same direction the shaft $o^2$ of the driving element O will rotate in this same direction, and that the r.p.m. of the shaft $o^2$ will be a function of the r.p.m.'s of the shafts $a$ and $a'$ and that this is also true of the spur gear $e$. It will further be apparent that if $e$ and/or the shaft of the driving element $o^2$ has a high inertia and/or is carrying a substantial load that acceleration of the speed of rotation of $a$ will result in a positive and strong tendency to decelerate the speed of rotation of the shaft $a'$. The converse of this is also true, i.e., acceleration of $a'$ will result in a positive and strong tendency to decelerate $a$.

As will be apparent from the Fig. 1, shafts $a^2$ and $a^3$ are similarly connected by means of gearing and a differential mechanism.

As will also be apparent from the Fig. 1, spur gears $e$ and $e'$ are similarly connected by means of gearing and a differential mechanism.

If, instead of the loading above suggested, a load L is imposed on, and a mass represented by a flywheel FW is attached to, the shaft $o^7$ of the differential mechanism O' as illustrated in Fig. 1, then when shaft $a$ is accelerated there will be a positive and strong tendency to decelerate shaft $a'$, a tendency to accelerate the rotative speed of the load L and of the flywheel FW and a tendency to decelerate shafts $a^2$ and $a^3$. However, it will further be apparent that by far the greatest deceleration tendency will be applied to the shaft $a'$. This preponderant tendency to decelerate $a'$ can be increased by increasing either the inertia of the flywhel FW or the magnitude of the load L, or both.

An alternative relationship is indicated in Fig. 1a. In this form, a spur gear $f$ is substituted for the differential mechanism O'. This spur gear $f$ meshes with the spur gears $e$ and $e'$ of Figs. 1 and 1a. A load L is imposed on, and a mass represented by a flywheel FW is attached to the shaft $m$ of the spur gear $f$. Operatively, this assembly differs from that of Fig. 1 chiefly by virtue of the fact that acceleration of $e$ tends to accelerate $e'$ and thus tends to accelerate shafts $a^2$ and $a^3$, rather than to decelerate them as is the case in the previously described form.

While my invention for rotating a crank shaft will function without the system of differential gear trains and associated load and inertia, which has just been described; both the efficiency of the overall power plant and the rotative speed range of the output shaft D will be vastly increased by the said system of differential gear trains and associated load and inertia.

Figure 3:
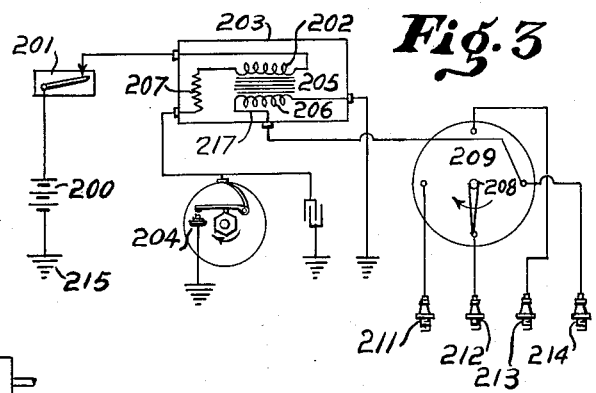
Fig. 3 is a diagram of a standard ignition system of an internal combustion engine.
Figure 4:
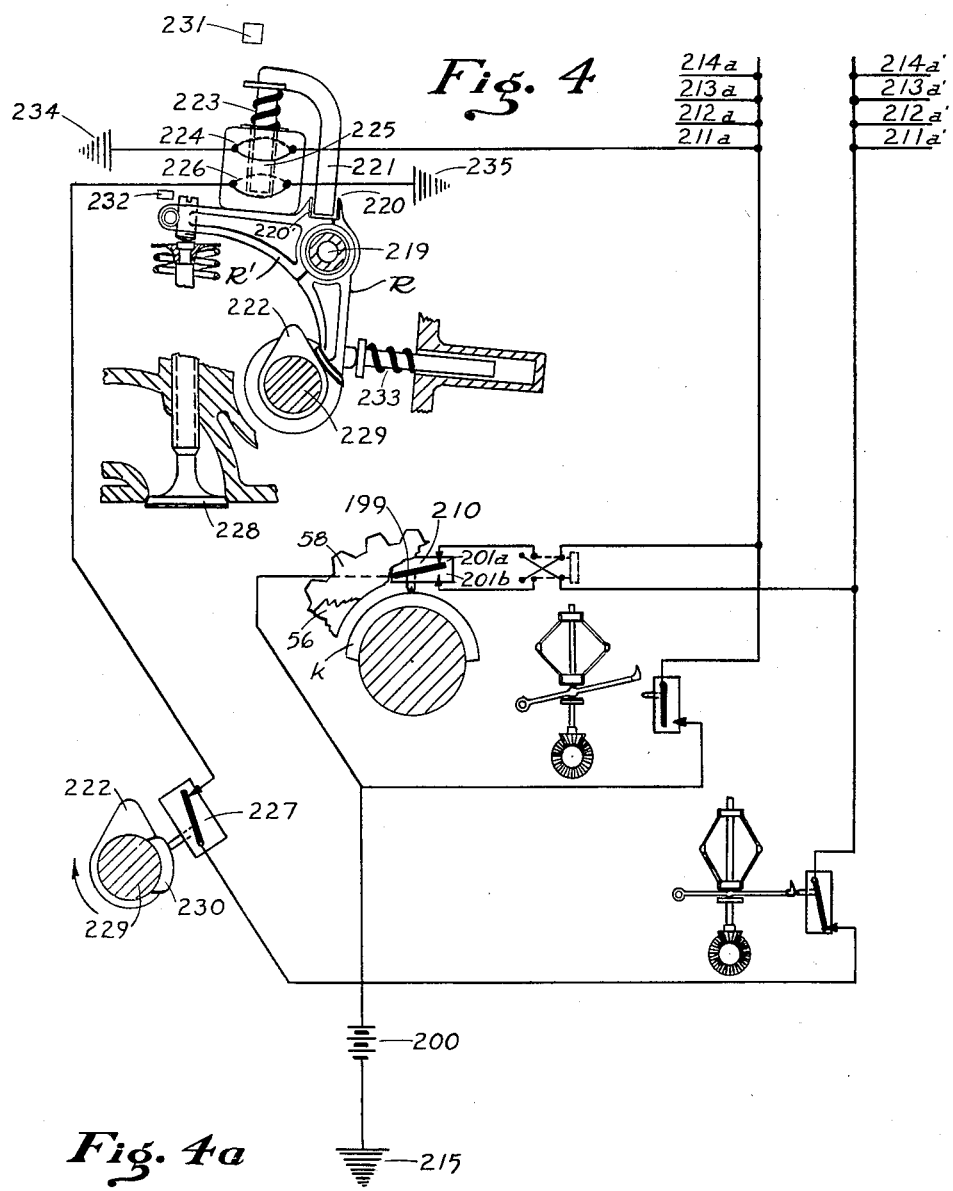
Fig. 4 is a diagrammatic view illustrating apparatus for controlling engine ignition systems and exhaust valves.
Figure 4A:
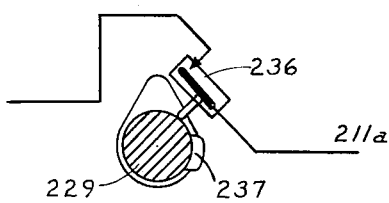
Fig. 4a is a diagram of a refinement optionally included in the apparatus illustrated in Fig. 4.

In the embodiment illustrated in Figs. 3, 4 and 4a, means are provided for controlling the ignition circuits of the individual engines and thereby providing accelerating or working periods and decelerating or loafing periods for each of the individual engines so timed as to make the tension force transmitted from each of said driving shafts to its corresponding said output shaft crank portion greater during that portion of each revolution of said output shaft in which said tension force tends to rotate (or maintain in rotation) said output shaft in the desired direction of rotation, than the tension force transmitted from each of said driving shafts to its corresponding said output crank portion during that portion of each revolution of said output shaft in which said tension force opposes rotation of said output shaft in the desired direction.

This means of ignition system control is used in conjunction with the means for governing time of initiation of accelerating or working periods and decelerating or loafing periods illustrated in Figs. 5, 5a, 5b, 5c and 6, and described later. Said governing means provides automatic control for advancement or retardment of time of initiation of engine accelerating or working periods and time of initiation of decelerating or loafing periods under the condition of forward rotation of output shaft D (clockwise as indicated by the solid line arrow of Figs. 4 and 5), as well as for the condition of reverse rotation of output shaft D (counterclockwise as indicated by the broken line arrow of Figs. 4 and 5), by automatically controlling the angular position of micro-switch 210, Fig. 4, about the shaft D.

Figure 5:
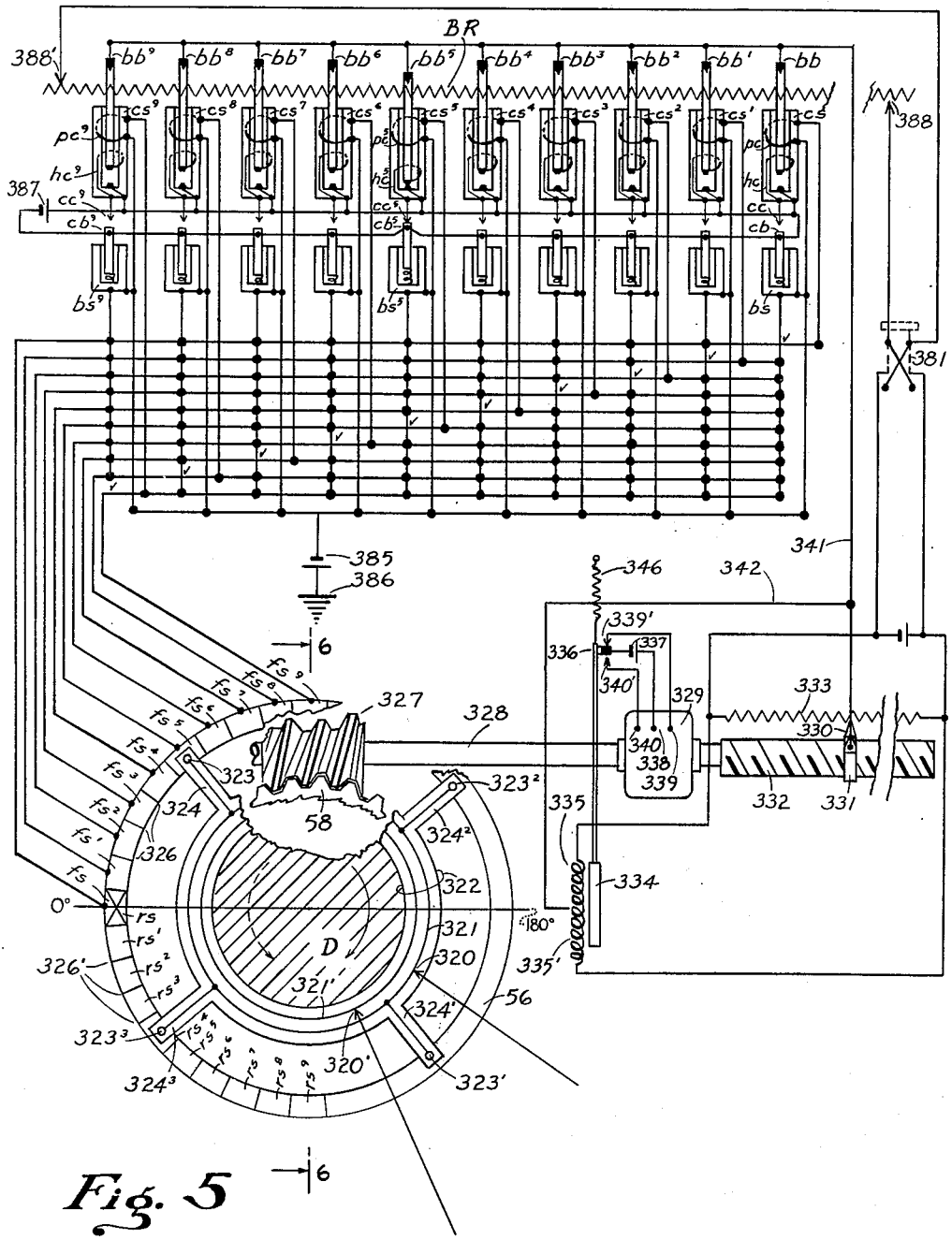
Fig. 5 is part of a diagrammatic view illustrating automatic apparatus for governing time of initiation of accelerating periods and decelerating periods of the individual engines.

Sleeve 56 and its integral gear 58 of Fig. 4 are identical with sleeve 56 and gear 58 of Fig. 5. Thus, by virtue of said means for governing time of initiation, sleeve 56 and micro-switch 210 mounted integrally therewith will be continuously and automatically so positioned angularly relative to shaft D, whether that shaft is rotating in the forward (clockwise) direction or is rotating in the reverse (counterclockwise) direction, as to close and/or open switches 201a and 201b, to initiate accelerating or working periods and decelerating or loafing periods, at times which will cause time of equal speeds of rotation (r.p.m.'s) of the pair of engines A and A' (whose ignition systems are thereby controlled) to be at or near the 0° or 180° positions (Figs. 2 and 4) of their respective crank arms $d$ and $d'$ (Figs. 1 and 2). As a frame of reference, the angular position of the crank arm $d$ (of the output shaft D), driven by engine A, with reference to the horizontal line through the output shaft D (Figs. 1 and 2) is used. 0° or positional index is taken at the point where crank arm $d$ is on the horizontal line through the center of the crank shaft and at its farthest position from the flywheel B. From this starting point the scale runs clockwise, as viewed in Figs. 2 and 4, around the output shaft D following the path of the crank arm $d$. This is forward rotation of the output shaft.

In Fig. 3 a usual form of battery ignition system is diagrammatically illustrated. The source of current is the storage battery 200, which connects through a switch 201 to the primary winding 202 of a spark coil 203. The other end of the primary winding 202 of the coil 203 is connected to the interrupter 204 and through it, when the interrupter contact points are closed, to ground, i.e., the engine block and chassis frame. One terminal of the battery also is grounded—at 215. With switch 201 closed, when the circuit is closed by the contacts of the interrupter 204, current from the battery 200 flows through the switch 201, the primary winding 202 of the coil 203, the breaker 204, and back to the battery through ground 215.

The spark coil has a magnetic core 205 of very soft iron wire or sheet, and two windings (primary and secondary) of insulated wire. The primary winding 202 has a relatively small number of turns of coarse wire, and the secondary winding 206 has a very large number of turns of very fine wire. A small "ballast coil" 207 is included in the primary circuit.

One end of the secondary winding 206 of the coil 203 is grounded. The other end of the secondary winding 206 connects through a cable 217 to the central terminal 208 of the high-tension distributor 209 which connects the secondary winding 206 of the coil 203 in turn to the different spark plugs 211, 212, 213 and 214 of the engine, in their firing order. When the time arrives for the charge in any particular cylinder to be ignited, the spark plug in that cylinder has been placed in electrical connection with the secondary winding 206 of the spark coil 203, and when the primary circuit is then opened by the interrupter 204, a spark is produced between the "points" of the spark plug.

Switch 201a of Fig. 4 corresponds to switch 201 of Fig. 3, being the corresponding switch in the ignition circuit CA of engine A. Similarly switch 201b is the corresponding switch in the ignition circuit CA' of engine A'. Opening of the switch 201a makes inoperative the ignition system of engine A. Closing of the switch 201a makes operative the ignition system of engine A. Associated with the switch 201a is the switch 201b which opens or closes the ignition circuit of engine A'. Thus switch 201a is closed when the accelerating or working period of the engine A is to be initiated and is opened when the decelerating or loafing period of engine A is to be initiated. Similarly, switch 201b controls the accelerating or working periods and the decelerating or loafing periods of engine A'.

Engines A and A' are the two individual engines of a pair which has been previously defined as "the two engines of which the respective accelerating or working periods and decelerating or loafing periods are 180° out of phase by virtue of the phase relationship of their respective crank arms of the output shaft D, and the relationship of the engine positions."

The opening and closing of switch 201a and switch 201b (micro-switch 210), Fig. 4, is controlled by cam $k$ which is integral with output shaft D. Cam $k$ closes switch 201a and opens switch 201b by lifting plunger $h$ and the switch arm 199. The reverse operation, i.e. opening switch 201a and closing switch 201b, is accomplished by the movement of cam $k$ out of engagement with the plunger $h$ of the micro-switch 210, thus dropping plunger $h$ and switch arm 199. Index arrow $da$ indicates the position of crank arm $d$ (the crank arm of engine A) and index arrow $d'a$ indicates the position of crank arm $d'$ (the crank arm of engine A') with respect to the cam $k$. This positioning is convenient but may be varied as long as substantially the indicated relationship between microswitch 210 and cam $k$ is maintained when cam $k$ is otherwise positioned relative to the indicated crank arm positions.

Means are provided for prevention of fuel waste during the decelerating or loafing period of an engine (i.e., when its respective ignition circuit is open), which would otherwise take place due to the pumping of unignited fuel thru the cylinders. In the form described below, such fuel waste is prevented by rendering the exhaust valves of the respective engine inoperative during the period in which the ignition circuit of that engine is inoperative. To that end, means are provided as illustrated in Fig. 4, wherein is shown a modified form of a standard mechanism for actuating and controlling an exhaust valve of an engine. This standard mechanism is modified as indicated in Fig. 4 by cutting the rocker arm into two portions R and R' each mounted on the same pin 219 on which the rocker arm is mounted in the unmodified form. Near the pin or bearing end of each half rocker arm R and R' is a recess, respectively 220 and 220'. A pawl 221 may be selectively engaged or disengaged from this notch jointly provided by the recesses 220 and 220'. When the pawl 221 is thus engaged in the notch 220—220', then the compound rocker arm R—R' acts as a unit rocker arm just as in the unmodified standard case. When the pawl 221 is disengaged from the notch 220—220', then actuation of the half rocker arm R by the cam 222 does not actuate the half rocker arm R'. The pawl 221 is actuated by the "push-in" solenoid H which is mounted on, and integral with, the half rocker arm R'. The spring backed plunger 233 keeps half rocker arm R in engagement with cam 222 which is integral with the cam shaft 229. Stop 231 limits the upward movement of armature 225. Stop 232 limits the upward movement of half rocker arm R'.

In Fig. 4 the spring 223 is a compression spring which acts to disengage the pawl 221 from the notch 220—220'; while the pulling coil 224 (of the "push-in" solenoid H) when energized is sufficiently powerful to pull the armature 225 and thus pawl 221 down and engage it in the notch 220—220' against the opposing lifting or disengaging force of the spring 223. Additionally, the holding coil 226 when energized acts to hold the pawl 221 in the notch 220—220' if, and only if, the pawl 221 is positioned in that notch while the holding coil 226 is energized. The holding coil 226 when thus energized is sufficiently powerful to hold the pawl 221 in the notch 220—220' against the lifting or disengaging force of the spring 223, but is not sufficiently powerful to overcome the lifting force of the spring 223 when the pawl 221 is not in engagement with notch 220—220' at the time of energization of the holding coil 226. In other words the holding coil 226 is not sufficiently powerful to move the armature 225 downward, moving the pawl 221 downward into engagement with the notch 220—220'; but is sufficiently powerful to hold the armature 225 in the downward position engaging the pawl 221 in the notch 220—220', when it is thus positioned at or during the time of energization of the holding coil 226.

The lead 211a connects directly from one terminal of the pulling coil 224 to the circuit CA and thus to switch 201a. The other terminal of the pulling coil 224 is connected to ground 234. Consequently, it will be apparent that when circuit CA is energized (firing condition for cylinders of engine A) that circuit 211a will also be energized thus energizing pulling coil 224 and engaging pawl 221 in the notch 220—220'.

The holding coil 226 is in series with the micro-switch 227 being in a circuit branch between battery 200 and ground 235 which circuit branch is in parallel with the just described circuit branch through pulling coil 224.

As explained above, the function of the holding coil 226 is to hold pawl 221 in the downward or notch engaging position against the lifting force of the spring 223 when it (226) is energized as it (226) will be when and only when micro-switch 227 is closed. It must be noted that if pawl 221 has not been pulled into the notch engaging position by the pulling coil 224 at the time of the closing of micro-switch 227 (or is not so pulled during the time that micro-switch 227 is closed), then energization of the holding coil 226 is not sufficient to pull the pawl 221 downward into such notch engaging position against the lifting force of the spring 223.

In order that the compound rocker arm R—R' will not be rendered ineffective to open the exhaust valve 228 after the ignition has fired a charge in the respective cylinder shortly before circuit CA has been opened by switch 201 (i.e., when switch 201 is opened during the working stroke of the respective piston), the following means have been provided. The micro-switch 227 is adjacent to the cam shaft 229 and is actuated by a small auxiliary cam 230 which keeps the micro-switch 227 closed during the time interval from just prior to the earliest firing time (under most advanced spark setting) for the cylinder until at least the time at which the cam 222 has started to lift the rocker arm R and has lifted it sufficiently to pinch the pawl 221 in the notch 220—220' and hold it against the lifting action of the spring 223. Alternatively the cam 230 may be extended to be effective during the entire working period of the cam 222. During the rest of the time the micro-switch 227 will be open. Thus, during this latter period of time the holding coil 226 can not be energized.

It will thus be apparent that when a charge is fired in the corresponding cylinder, it will be exhausted in the usual manner; but that when a charge is not fired, it will not be exhausted in the usual manner; but most of the unburned charge will be returned to the manifold intake line via the intake valve when it is next opened and then reintroduced into the cylinder during the subsequent intake stroke. An exception to the preceding statement is the case of the unfired charge in a cylinder during what would otherwise be the working stroke of a piston i.e., when an accelerating or working period of an engine is initiated subsequent to the time at which that charge would have been fired had the engine not been in its decelerating or loafing period. This unburned charge will be exhausted via the regular exhaust valve and thus wasted. Later, two refinements will be described; one for the conservation of most of these otherwise wasted charges and the other for the conservation of virtually all of them.

The three additional circuits 212a, 213a and 214a in combination with circuit CA each control exactly similar mechanism to that described above and thereby each controls the similar events of one of the other of the four cylinders of the engine A. The similar events of the engine A' are controlled in a manner parallel to that described for engine A.

It will be apparent that circuit CA' and circuits 211a', 212a', 213a' and 214a' will operate synchronously with and substantially 180° out of phase with their corresponding circuits CA and 211a, 212a, 213a and 214a. In Fig. 4, da indicates the position of crank arm d (the crank arm of engine A) of Figs. 1 and 2 and d'a indicates the position of the crank arm d' (the crank arm of engine A') of Figs. 1 and 2 with respect to the cam k. Circuits CA' and 211a', 212a', 213a' and 214a' control the operation of engine A' in a manner exactly similar to the described manner in which circuit CA and 211a, 212a, 213a and 214a control engine A, but impose a timing of the critical events for engine A' 180° out of phase with the timing of the critical events for engine A.

Means for reversing the direction of rotation of output shaft D are provided by the reversing switch Q. In the dotted line position of Q as shown in Fig. 4, engine A, Fig. 1, will be in its accelerating or working periods when its corresponding crank arm d, Figs. 1 and 2 is above the horizontal center line (0°–180°, Figs. 2 and 4) of output shaft D and will be in its decelerating or loafing period when its corresponding crank arm d, Figs. 1 and 2, is below the horizontal center line of the shaft D, save and except as this is modified by changing the angular position of micro-switch 210 as referred to previously and described later. By virtue of the fact that crank arm d' Figs. 1 and 2, is 180° out of phase with the crank arm d (and the indicated relationship, Fig. 4, of their positions to the cam k) it will be apparent that similarly engine A' will be in its accelerating or working period when its respective crank arm d' is above the horizontal center line (0°–180°, Figs.

2 and 4) of output shaft D and will be in its decelerating or loafing period when its corresponding crank arm $d'$ is below the horizontal center line of shaft D, save and except as this is modified by changing the angular position of micro-switch 210.

Said changing of the angular position of micro-switch 210 (advancement and retardment of time of initiation of engine accelerating or working and decelerating or loafing periods) as referred to previously and described later, will result in the condition of operation in which approximately the maximum net difference in draw bar pulls due to engine A and engine A' will always be applied efficiently in the clockwise direction (see Figs. 1, 2 and 4) i.e., the draw bar pull due to engine A will be greater than the draw bar pull due to engine A' when crank arm $d$ is above the horizontal center line of output shaft D and crank arm $d'$ is below the horizontal center line of output shaft D; while the draw bar pull due to engine A' will be greater than the draw bar pull due to engine A when crank arm $d'$ is above the horizontal center line of output shaft D and crank arm $d$ is below the horizontal center line of output shaft D. Thus, it will be apparent that with the reversing switch Q in the dotted line position, the shaft will be rotated or tend to be rotated in the clockwise or forward direction.

When the reversing switch Q is thrown to its alternative position the engines A and A' will be in their respective accelerating or working periods when their respective crank arms are below the center line of output shaft D (0°–180°, Figs. 1, 2 and 4) and will be in their respective decelerating or loafing periods when their respective crank arms are above the horizontal center line of the shaft D, save and except as this is modified by changing the angular position of micro-switch 210. Said changing of the angular position of micro-switch 210 (advancement of time of initiation of engine accelerating or working periods and decelerating or loafing periods) will result in the condition of operation in which approximately the maximum net difference in draw bar pulls due to engine A and engine A' will always be applied in the counter clockwise direction (see Figs. 1, 2 and 4) i.e., the draw bar pull of the engine A will be greater than the draw bar pull of engine A' when crank arm $d$ is below the horizontal center line of output shaft D and crank arm $d'$ is above the horizontal center line of output shaft D; while the draw bar pull due to engine A' will be greater than the draw bar pull due to engine A when crank arm $d'$ is below the horizontal center line of output shaft D and crank arm $d$ is above the horizontal center line of output shaft D. Thus, it will be apparent that with the reversing switch Q in this alternative position the output shaft D will be rotated or tend to be rotated in the counter clockwise direction.

This statement is modified to the extent that if output shaft D is already rotating in one direction at the time that the reversing switch Q is thrown to its alternative position, then the first effect will be to impose a braking action on D, rapidly bringing it to a stop and then rotating D in the direction consistent with the above description. Since during this braking period, degree of advancement of "time of initiation" will be under automatic control by the governing mechanism of Figs. 5, 5a, 5b and 6 described later, maximum efficient application of the draw bar pulls both for the braking action and for rotation in the newly selected direction, will be provided.

Control of engines $A^2$ and $A^3$ is provided by means exactly similar to that illustrated in Fig. 4 for the control of engines A and A', save and except that the micro-switch controlling circuits $A^2$ and $A^3$ and corresponding to micro-switch 210 of Fig. 4 is placed 90° out of phase with the position of micro-switch 210 relative to the cam $k$. Thus there is imposed a timing of critical events for engine $A^3$ 180° out of phase with the timing of critical events for engine $A^2$; the timing of critical events for both engines $A^2$ and $A^3$ also being 90° out of phase with the timing of critical events for engines A and A'.

Now let us consider the two refinements referred to above. We will first consider that one of those two refinements which is designed "for the conservation of most of these otherwise wasted charges." This refinement is illustrated in Fig. 4a. Micro-switch 236 is inserted into the circuit 211a. This micro-switch is actuated by the cam 237 which is integral with the cam shaft 229 (identified as the cam shaft carrying cams 222 and 230). The angular extent of the cam 237 and its angular position in relationship to the micro-switch 236 is just sufficient to keep said micro-switch 236 closed during the time interval in which ignition takes place in the corresponding cylinder for the entire range of spark advancement from maximum advancement of spark to minimum advancement of spark. During the rest of the time micro-switch 236 will be open. Thus the pulling coil 224 can only be energized during the time range within which ignition for the particular cylinder is due to take place. Exactly similar means are provided for circuits $B'a$, $B^2a$ and $B^3a$ of engine A and for the corresponding circuits of engines A', $A^2$ and $A^3$. Thus most of the "otherwise wasted charges" referred to above will be conserved.

The second of the two refinements above referred to is a refinement of the refinement described in the immediately preceding paragraph and illustrated in Fig. 4a. In this latter refinement the angular dimension of the top of the cam 237 is reduced almost to a point so that the cam is only operative to close micro-switch 236 for an extremely short time period. In addition, micro-switch 236 is automatically angularly adjusted about the axis of the cam shaft 229 by the spark timing device, for example, that illustrated in Fig. 8, page 483 of High Speed Combustion Engines by Heldt. Thus the pulling coil 224 can only be energized at the time which is coincident with time of ignition in the corresponding cylinder. Exactly similar means are provided for circuits 212a, 213a and 214a of engine A and for the corresponding circuits of engines A', $A^2$ and $A^3$. Thus, virtually all of the "otherwise wasted charges" referred to above will be conserved.

While my invention for rotating a crank shaft will function equally as well without means for prevention of fuel waste such as above described, economy of operation requires the provision of some means for prevention of fuel waste which would otherwise take place during the decelerating or loafing periods of each of the individual engines, in that form of my invention in which control of the ignition circuits of the individual engines provides the accelerating or working periods and the decelerating or loafing periods for each of the individual engines.

When the decelerating or loafing period of an engine is excessively long, the engine will, unless otherwise prevented, drop below a certain minimum r.p.m. and stall or stop. In order to provide against this, by-passing switches are provided. Each of these switches is controlled by a speed sensitive governor driven by the respective shaft $a$, $a'$, $a^2$ or $a^3$ of the respective engine A, A', $A^2$ or $A^3$. When the rotative speed (r.p.m.) of an engine drops below the predetermined idling r.p.m., the corresponding by-passing switch will be closed and when the r.p.m. of the engine increases above the predetermined idling speed the corresponding by-passing switch will be opened.

These by-passing switches may be in the form of micro-switches as illustrated in Fig. 4. In that Fig. 4, micro-switch 238 is installed in circuit CA in parallel with micro-switch 210 and reversing switch Q. Thus, when micro-switch 238 is in its closed position switch 201a of micro-switch 210 will be ineffective to open circuit CA. When micro-switch 238 is open switch 201a of micro-switch 210 will function effectively as previously described.

239 is a speed sensitive flyball governor driven by the shaft a of engine A. The governor 239 includes the usual collar 240 slidably mounted on the shaft 241 to move upward and downward as the speed of the shaft increases and decreases. The collar 240 is operatively connected to an intermediate portion of a lever 242 which is journalled at one end on a pivot 243. The contact 244 at the other end of the lever 242 opens the micro-switch 238 when in contact with the plunger 245 of said micro-switch 238. As the rotative speed of the shaft a and consequently of the shaft 241 increases, the contact end 244 of the lever 242 will be raised out of engagement with the plunger 245, thus opening micro-switch 238. It will thus be apparent that when the shaft a is rotating in excess of a certain minimum speed, micro-switch 238 will be open, allowing switch 201a of micro-switch 210 to operatively control the ignition of engine A as previously described. It will further be apparent that when the rotative speed of shaft a of engine A has dropped to a certain predetermined minimum the micro-switch 238 will be closed, thus rendering operative the ignition circuit of engine A. Thus it is obvious that engine A will not be allowed to fall below a certain minimum speed regardless of how long the decelerating or loafing period of said engine A is. The object of the means just described is to prevent stalling of the individual engine during the long decelerating or loafing periods which obtain during periods in which the output shaft D is rotating at low speeds (r.p.m.'s). Similar means is provided in each of the circuits CA, CA', CA$^2$ and CA$^3$.

The above referred to means for governing time of initiation of accelerating or working periods and decelerating or loafing periods of the individual engines is diagrammatically illustrated in Figs. 5, 5a, 5b, 5c and 6. The function of this governing means is to advance (or retard) the time of initiation of said accelerating periods and decelerating periods just sufficiently to make the time of equal speeds of rotation (r.p.m.'s) of the two engines of a pair (previously defined) approximately coincident with the 0° and 180° positions (previously defined) of the output shaft crank arms of the respective engines, as is desirable when, as shown in the preferred arrangement of Fig. 2, the proportions of the links 13, 13', 14, 14', 18 and 18' are so chosen in relation to the throw of the crank arm d (i.e., the distance from center of d to center of D) and the centers of gravity 19 and 19' of the weights C and C', that the draw bar pulls exerted for any rotative speed of the flywheel B and shaft a, is approximately the same for 0° position of crank arm d as for 180° position of crank arm d.

In Fig. 5a, I is a device for indicating the instant of equal speeds of rotation (r.p.m.'s) of the engines A and A'. G is a speed sensitive flyball governor driven by the shaft a of engine A. G' is a similar governor driven by the shaft a' of engine A'. A collar 301 is rotatably mounted on the collar 302 which latter is slidably mounted on the shaft 303. Integral with this collar 301 are two pivots, 304 and its diametrically opposed counterpart. On said pivots is mounted the bifurcated end of the rod 305.

A similar rod 305' is similarly mounted on the pivots 304' which are integral with the collar 301' rotatably mounted on the collar 302' of the governor G'.

The unbifurcated ends of these two rods 305 and 305' respectively engage the ends of the sleeve 306 which is rotatably mounted on the pivot 307 carried by the sleeve 308 which is slidably mounted on the rod 309.

Integral with the sleeve 306 is a switch actuating arm 310 extending downward from the sleeve 306 and for convenience at right angles to the sleeve 306. On the lower end of the sleeve 308 is mounted a micro-switch 311, so positioned that it is actuated (closed) by the arm 310 when that arm is in its vertical downward position which corresponds to the horizontal position of the sleeve 306 which in turn corresponds to the time of equal speeds of rotation (r.p.m.'s) of the engines A and A'. This is the position illustrated.

I' is a device (identical with I) for indicating the time of equal speeds of rotation (r.p.m.'s) of engines A$^3$ and A$^2$. G$^3$ is driven by engine A$^3$. G$^2$ is driven by engine A$^2$. This indicator I' is illustrated in the position in which A$^3$ has a relatively low speed of rotation (r.p.m.) and A$^2$ a relatively high speed of rotation (r.p.m.) and correspondingly G$^3$ has a relatively low speed of rotation (r.p.m.) and G$^2$ a relatively high speed of rotation (r.p.m.). Thus the micro-switch 311' is open.

One contact of micro-switch 311 is electrically connected to ground 312. The other contact of micro-switch 311 is electrically connected to the contact or brush 320, Fig. 5, which engages or is in electrical contact with the contact ring 321 of the assembly 322 which is integrally mounted with the shaft D (which is the output shaft D of Figs. 1, 2 and 4). This contact ring 321 is electrically connected to brushes 323 and 323' carried respectively by arms 324 and 324' of the assembly 322. At all times the angular position of arm 324 is identical with the angular position of crank arm d of Figs. 1 and 2, and the angular position of arm 324' is identical with the angular position of crank arm d' of Figs. 1 and 2.

Similarly, one contact of micro-switch 311' is electrically connected to ground while the other contact is electrically connected to contact or brush 320' which in turn is in electrical contact with the contact ring 321' which is electrically connected to brushes 323$^2$ and 323$^3$ carried respectively by arms 324$^2$ and 324$^3$ of the assembly 322. At all times the angular position of arm 324$^2$ is identical with the angular position of crank arm d$^2$ of Figs. 1 and 2, and the angular position of arm 324$^3$ is identical with the angular position of crank arm d$^3$ of Figs. 1 and 2.

Each of the brushes 323, 323', 323$^2$ and 323$^3$ carried by these arms is backed by a spring 325, 325', 325$^2$ and 325$^3$ (springs 325 and 325$^3$ being shown in Fig. 6), which insures electrical contact respectively of each of said brushes with the end of the sleeve 56, Figs. 5 and 6.

This sleeve 56 is rotatably mounted about the axis of the shaft D as diagrammatically illustrated in Figs. 5 and 6. As shown in Fig. 6, contact segments fs, fs' . . . fs$^9$ are mounted on the end of the sleeve 56. As illustrated, these contact segments each embrace an angle of 10°, less the space occupied by one of the insulating strips 326 or gaps interposed between said segments. Desirably, these insulating strips 326 or gaps are slightly wider than the contact ends of the brushes 323, 323', 323$^2$ and 323$^3$; although this is not strictly necessary.

Contact segments rs, rs' . . . rs$^9$ are mirror image counterparts of contact segments fs, fs' . . . fs$^9$. Each is electrically connected (for simplicity connectors not shown) to its correspondingly numbered counterpart; rs merging and being identical with fs.

Under the condition of forward (clockwise) rotation of output shaft D and when the means for governing time of initiation of accelerating or working periods and decelerating or loafing periods is in operative adjustment, the micro-switch 311 of indicator I will be closed only when arm 324 or arm 324' is in the quadrant occupied by the contact segments fs, fs' . . . fs$^9$ (except under certain transient conditions not provided for in the form illustrated in Figs. 5, 5a and 5c; but which are provided for in a modification described later). Similarly, the micro-switch 311' of device I' will be closed only when arm 324$^3$ or arm 324$^2$ is in said quadrant occupied by the contact segments fs, fs' . . . fs$^9$. Thus, for forward (clockwise) rotation of output shaft D, only contact segments fs, fs' . . . fs$^9$ are operative and contact segments rs', rs$^2$ . . . rs$^9$ are inoperative (save and except under the above mentioned transient conditions which call for a greater than 90° rotation of sleeve 56).

Similarly, under the condition of reverse (counter-clockwise) rotation of output shaft D, the micro-switch 311 of indicator I will be closed only when arm 324 or arm 324' is in the quadrant occupied by the contact segments $rs$, $rs'$ ... $rs^9$ (save under said transient conditions), and the micro-switch 311' of indicator I' will be closed only when arm $324^3$ or arm $324^2$ is in said quadrant occupied by contact segments $rs$, $rs'$ ... $rs^9$. Thus for reverse (counterclockwise) rotation of output shaft D, only contact segments $rs$, $rs'$ ... $rs^9$ are operative, and contact segments $fs'$, $fs^2$ ... $fs^9$ are inoperative (save under said transient conditions).

Now, as has been pointed out, indicator I' is controlled by engines $A^3$ and $A^2$. Consequently, time of equal r.p.m.'s as indicated by indicator I' is substantially 90° out of phase with time of equal r.p.m.'s as indicated by indicator I. This is the reason that signals given by indicator I' are transmitted by way of brush 320', conductor ring, and brushes $323^3$ and $323^2$ carried by arms $324^3$ and $324^2$ which are 90° out of phase with arms 324 and 324'. Save for the phase relationship, the signal given by indicator I' operates the solenoids and bridge circuit, and controls the positioning of the sleeve 56 in precisely the same fashion as that described later for the signal given by indicator I. It will thus be apparent that there will be four such positioning signals for each revolution of the shaft D. Each of these signals will choose a contact solenoid $cs$, $cs'$ ... $cs^9$ which will require a degree rotation for the sleeve 56 corresponding to the degree position of the arms 324, 324', $324^2$ and $324^3$ transmitting the signal, and corresponding to the degree position of the respective crank arms $d$, $d'$, $d^2$ or $d^3$, Figs. 1 and 2, at the time of equal r.p.m.'s of the corresponding pair of engines (A—A' or $A^2$—$A^3$).

By means of the conductor network shown in Fig. 5, each of these contact segments $fs$, $fs'$ ... $fs^9$ is selectively connected in such fashion that when the circuit through one of them is energized, only the one corresponding pulling coil ($pc$, $pc'$ ... $pc^9$) of the respective bridge contact solenoid of the series ($cs$, $cs'$ ... $cs^9$) will be energized, while only the one corresponding circuit breaker solenoid of the series ($bs$, $bs'$ ... $bs^9$) will not be energized, and all of the remaining circuit breaker solenoids will be energized. Thus the holding coil ($hc$, $hc'$ ... $hc^9$) of said bridge contact solenoid whose pulling coil is energized will be operative, while said holding coils of all of the other bridge contact solenoids of the series ($cs$, $cs'$ ... $cs^9$) will be rendered inoperative.

In the form illustrated, there are ten of these bridge contact solenoids $cs$, $cs'$ ... $cs^9$ and corresponding thereto are ten circuit breaker solenoids $bs$, $bs'$ ... $bs^9$. The ten operative bridge contacts $bb$, $bb'$ ... $bb^9$, are respectively integral with the solenoid armatures of the bridge contact solenoids $cs$, $cs'$ ... $cs^9$. Bridge contact $bb$ is positioned at the midpoint of the resistance BR and when in its closed position calls for positioning contact segment $fs$ at 0° i.e., zero rotation of sleeve 56. As previously specified as a frame of reference, the angular position of the crank arm $d$ (of the output shaft D), driven by engine A, with reference to the horizontal line through the output shaft D (Figs. 1 and 2) is used. 0° or positional index is taken at the point where crank arm $d$ is on the horizontal line through the center of the crank shaft and at its farthest position from the flywheel B. From this starting point the scale runs clockwise, as viewed in Figs. 2, 4 and 5 around the output shaft D following the path of the crank arm $d$. Under the condition of forward (clockwise) rotation or output shaft D, each of the other bridge contacts $bb'$, $bb^2$ ... $bb^9$ calls for and corresponds to a specific amount of total degrees of counterclockwise rotation of sleeve 56 i.e., advancement of times of initiation of said accelerating periods and decelerating periods, each such called for total degree of counterclockwise rotation being progressively 10° greater than that called for by the preceding bridge contact i.e.:

| | Degrees |
|---|---|
| $bb$ | 0 |
| $bb'$ | 10 |
| $bb^2$ | 20 |
| $bb^3$ | 30 |
| $bb^4$ | 40 |
| $bb^5$ | 50 |
| $bb^6$ | 60 |
| $bb^7$ | 70 |
| $bb^8$ | 80 |
| $bb^9$ | 90 |

While under the condition of forward (clockwise) rotation of output shaft D, the said degrees of rotation of sleeve 56 will be in the counterclockwise direction; under the condition of reverse (counterclockwise) rotation of shaft D, the said degrees of rotation of sleeve 56 will be in the clockwise direction.

In Fig. 5 is diagrammatically illustrated means for rotating the gear 58 and thus its integral sleeve 56 in automatic response to the direction and degree of rotation of sleeve 56 called for by each of the bridge contacts $bb$, $bb'$ ... $bb^9$ when said bridge contact is in its closed position i.e., in contact with the slide wire resistance BR. As shown in Fig. 5, the gear 58 is in operative engagement with the worm gear 327. The worm gear 327 is carried by the shaft 328 of a conventional reversible electrical motor 329. The motor 329 is automatically actuated to drive the worm gear 327 and thus the gear 58 in one direction or the other in automatic response to the said degree of rotation of sleeve 56 called for by each of the bridge contacts $bb$, $bb'$ ... $bb^9$ when in its closed position. Each of said contacts has its terminal electrically connected to a slider contact 330 carried by a contact carrier 331 having an internally threaded opening through which a threaded extension 332 of the shaft 328 of the motor 329 is threaded. The slide wire resistance 333 is parallel to the motor shaft extension 332, and as the motor 329 rotates in one direction or the other, the contact 330 is moved along the slide wire resistance 333 in one direction or the other.

The energization of the motor 329 is directly controlled by changes in the longitudinal position of an elongated solenoid armature by core 334 which is shown alongside, and may be axially disposed within the coil sections 335 and 335'. The armature 334 is shown as suspended by a spring 336 which opposes the gravitational tendency to downward movement of the armature 334 and thereby biases the latter to a neutral position in which the similar end portions of the armature are respectively alongside or within the coil sections 335 and 335' and equidistant from the junctions of the coil sections 335 and 335'. The armature 334 carries a contact 336 connected to one terminal of a source of motor energizing current 337. The second terminal of the current source 337 is connected to the neutral terminal 338 of the reversible motor 329. The other two terminals 339 and 340 of the motor 329 are connected to stationary contacts 339' and 340' respectively above and below the movable contact 336. The slider contact 330 is electrically connected to each of the bridge contacts $bb$, $bb'$ ... $bb^9$ by a conductor 341, and a branch conductor 342 connects the conductor 341 to the junction of the coil sections 335 and 335'.

In operation, when the bridge of Fig. 5 is normally balanced the currents flowing through the coils 335 and 335' are equal and the armature 334 holds the contact 336 between and out of engagement with the contacts 339' and 340'. Any change in the selection of the bridge contact $bb$, $bb'$ ... or $bb^9$ to be in contact with the resistance BR will then unbalance the bridge. Thus for example, assume that the balance of the bridge with bridge contact $bb$ selected and in contact with the resistance BR and thus with arm 323 positioned at 0°, is disturbed by substituting the selection of bridge contact $bb^5$ for contact with the resistance BR. The resultant unbalance of the bridge is in the direction to increase the current in the coil section 335 relative to the current in the coil section 335'. Thereupon the armature 334 is moved upward and thereby moves the contact 336 into engagement with the contact 339'.

The motor energizing circuit then closed causes the motor 329 to rotate in the direction to move the slider contact 330 to the right (i.e., toward the end of slide wire resistance 333 remote from the motor 329), and to move the gear 58 counter-clockwise as seen in Fig. 5.

The slide wire resistance 333 is so calibrated that these movements are just sufficient to again bring the bridge into balance at the instant that gear 58 and the integral sleeve 56 are positioned at the degrees of rotation called for by the bridge contact $bb^5$—50° as tabulated above for the form being described.

As previously explained, signals indicating time of equal speeds of rotation (r.p.m.'s) of a pair of engines will only occur through contact segments $fs, fs' \ldots fs^9$ for forward (clockwise) rotation of output shaft D; and will only occur through contact segments $rs, rs' \ldots rs^9$ for reverse (counter clockwise) rotation of output shaft D. Consequently, means as described below are provided for utilizing the circuit network, solenoid system, bridge etc. of Fig. 5 in connection with the contact segments $rs, rs' \ldots rs^9$ for governing time of initiation of accelerating and decelerating periods under the condition of reverse (counter clockwise) rotation of shaft D.

The double pole-double throw switch 381, Fig. 5, is indicated in the dotted line position for forward operation i.e., clockwise rotation of shaft D. When the shaft D is rotating in the reverse or counter clockwise direction this switch is to be thrown to its reverse position. This is accomplished automatically by means of the assembly of Fig. 5b. Loosely fitting about shaft D is a drag ring 382. When D is rotating in the clockwise direction, as indicated by the solid line arrow, there will be sufficient friction between shaft D and the drag ring 382 to cause the drag ring to take the position indicated in Fig. 5b, thus actuating the micro-switch 383, energizing the solenoid 384, and throwing the double pole-double throw switch 381 to the position shown in Fig. 5b. This position is identical with the dotted line position of 381 illustrated in Fig. 5.

When the shaft D is rotating in the counter clockwise direction there will be sufficient friction between the shaft D and the drag ring 382 to drag said drag ring around in a counter clockwise direction, opening micro-switch 383, closing micro-switch 383', thus energizing solenoid 384', and pulling the double pole-double throw switch 381 to its alternative position, thus conditioning the bridge circuit for reverse operation.

Now let us consider in detail the specific stage of operation illustrated in Figs. 5, 5a, 5b, and 5c. In addition to the general assumptions indicated above, the following specific assumptions are made:

(a) Forward operation or clockwise rotation of shaft D, with D rotating at a fairly high r.p.m. is in effect.

(b) Throttle setting for individual engines A, A', $A^2$ and $A^3$ is identical and is reasonably high.

(c) Engines A and A' have just reached the point of equal r.p.m.'s, while the r.p.m. of engines $A^3$ and $A^2$ are widely divergent.

(d) Just prior to the instant being considered, there has been no requirement for advancement of time of initiation of accelerating or working periods and decelerating or loafing periods, or, since this is an unreasonable operative condition in view of the large requirement for advancement which we will next be considering, let us assume that for the first time since output shaft D began to rotate, the switch 381 has just been closed, having previously been held open manually. Thus the governor of time of initiation of accelerating periods and decelerating periods has just been made operative.

At the instant being considered, it is evident from the position of the arm 324 and assumption (c) above, that the time of equal r.p.m.'s of engines A and A' occurs when crank arm D is positioned at 50°. It will thus be apparent that a circuit will be closed from ground 312 through micro-switch 311, through contact or brush 320, through contact ring 321, through brush 323, through contact segment $fs^5$, through the attached conductor, and through each of the coils (in parallel) of each of the circuit breaking solenoids $bs, bs' \ldots bs^9$ that of circuit breaking solenoid $bs^5$, and also (in parallel) through the pulling coil $pc^5$ of contact solenoid $cs^5$ to battery 385 and to ground 386

The check marks ($\sqrt{}$) in the circuit network, Fig. 5, are for the purpose of emphasizing and conveniently locating certain conductor crossings at which no connections are made, thus facilitating the tracing out of the operative circuits.

Battery 387 is the source of energization for the holding coils of bridge contact solenoids $cs, cs' \ldots cs^9$. A feature of the holding coil circuits of the bridge contact solenoids is the fact that each of such circuits is completed through a contact at the lower end of the solenoid armature and a contact at the base of the solenoid as illustrated. Thus a holding coil circuit is only closed when the respective armature is in its down position with these two contacts in engagement as is the case shown for bridge contact solenoid $cs^5$. There are springs (not shown in the drawing) which tend to hold the armatures of the bridge contact solenoids in their upward positions. Additionally, a holding coil circuit is only closed when the armature of the corresponding circuit breaking solenoid is at its upward position bringing the two respective contacts, one of series $cc, cc' \ldots cc^9$ and one of series $cb, cb' \ldots cb^9$ together. The purpose of the holding coil contacts in the bridge contact solenoids ($cs, cs' \ldots cs^9$ series) is to insure that energization of the said holding coils can not take place immediately subsequent to the breaking of the said holding coil circuits by the said circuit breaking solenoids at contact $cc$ etc. and $cb$ etc., even though that contact is immediately reestablished, without energization of the respective pulling coil.

Now when pulling coil $pc^5$ of the bridge contact solenoid $cs^5$ is thus energized and the corresponding circuit breaking solenoid $bs^5$ is thus not energized, the armature of the circuit breaking solenoid $bs^5$ will be pulled into its downward position, the holding coil $hc^5$ will be energized and the contact $bb^5$ will be held in contact with the resistance BR of the bridge circuit. The holding coil circuits of all of the other said contact solenoids having been opened by their respective said circuit breaking solenoids, their respective said armatures and said bridge contacts will be in their upward or disengaged positions.

As pointed out above, contact $bb$ corresponds to the mid-point of the resistance BR of the bridge circuit.

With the contact $bb^5$ engaging the resistance BR, the motor 329 will be operated in accordance with the previous description. Thus the motor will start to move the gear 58, which is integral with the sleeve 56, in a counter clockwise direction and unless interferred with by a subsequent signal substituting another contact for contact $bb^5$, will continue to drive that gear until sleeve 56 has assumed the position shown in Fig. 5c. That is, the sleeve 56 will be rotated 50°, positioning the micro-switch 210 of Fig. 4 at the point which provides for advancement, of time of initiation of said accelerating periods and decelerating periods, of 50°.

Now this advancement will result in some changes in speed of rotation of both output shaft D and engine shaft $a, a', a^2$ and $a^3$. Consequently, the time of equal r.p.m.'s of the engines of a pair, as indicated by indicators I and I', Fig. 5a, will not occur at precisely 0°. However, for simplicity of explanation, let us first disregard this change and assume that the time of equal r.p.m.'s does now occur at precisely 0°. Under that assumption, when time of equal r.p.m.'s is next signalled, one of the arms 324, 324', 324$^2$ or 324$^3$ will be positioned at 0° as indicated in Fig. 5c and the signal will be completed through contact segment $fs^5$ which calls for an advancement of 50° and which advancement has already been made. Thus the desired degree of advancement has been accomplished.

Each such signal and choice of contact solenoid will supersede the previous signal when a different contact solenoid is called for and will reiterate the previous signal when the contact solenoid chosen is the same as that chosen by the previous signal. Thus each time a signal is given an operation will be initiated (or confirmed) to provide an amount of advancement of time of initiation of accelerating periods and decelerating periods which will cause time of equal r.p.m.'s of the engines of a pair as indicated by indicators I and I', Fig. 5a, to fall at or near the 0° and 180° positions.

As suggested above, if the interval between time of initiation of accelerating periods and decelerating periods and time of equal r.p.m.'s of the engines of a pair, as indicated by indicators I and I', Fig. 5a, did not change by virtue of intervening changes in speed of rotation of both output shaft D and engine shaft $a$, $a'$, $a^2$ and $a^3$, the one signal calling for a 50° advancement as discussed in the example would position said time of equal r.p.m.'s at 0° and 180°. However, advancement or retardment of time of initiation does result in such changes. However, the closer that said time of equal r.p.m.'s is to the 0° and 180° positions at the time that said time of equal r.p.m.'s is signalled, the less the divergence will be between the signalled degree of advancement wanted and the precise degree of advancement required. Thus by successive signals and successive approximations, time of initiation may be precisely positioned at 0° within a ± limit fixed by one half the angle (10°—) subtended by the contact segments $fs$, $fs'$ ... $fs^9$. In the case illustrated this would be within ±5°—; which would be sufficiently accurate for ordinary requirements. Moreover, this accuracy can be improved by increasing the number of contact segments $fs$, $fs'$ ... $fs^9$ and corresponding solenoids.

The above description has been written on the assumption that the signals given by I and I' (the devices for indicating the instants of equal r.p.m.'s) are of such short duration in time as measured by degree rotation of shaft D as to be practically instantaneous. However, the signal is not instantaneous. This lag of the terminal point of the signal relative to the mid-point of the signal (which is the accurate and precise time designation) results in the balancing device seeing a requirement for somewhat greater advancement of time of initiation than is actually needed. This lag may be allowed for by adjusting the adjustable resistance contacts 388 and 388' in such fashion as to move the mid-point of the resistance BR away from coincidence with bridge contact $bb$ and in the direction of bridge contact $bb'$ by a resistance amount corresponding to a rotation of motor 329 corresponding to a retardment (relative to the previous resistance mid-point position) of the gear 58 and the sleeve 56 (clockwise rotation) corresponding to the degree lag of the signal indicating time of equal r.p.m.'s. Thus, for example, each of the bridge contacts $bb'$, $bb^2$ ... $bb^9$ will call for a degree of advancement equal to the degree of required advancement indicated by the time signal minus the degree of lag, which has been corrected for. This will leave bridge contact $bb$ in a position calling for a retardment of precisely the degree lag being compensated for by the new bridge setting. While this latter point is a matter of small consequence, in view of the fact that contact $bb$ is only specifying the degree of advancement or retardment when shaft D is rotating at very slow r.p.m.'s; nevertheless, even this small error may be compensated for by providing means (not illustrated) for adjusting the position of contact $bb$ and its associated solenoids $cs$ and $bs$ laterally along the resistance BR to coincidence with the new or compensated position of the mid-point of the resistance BR. If this lag correction is carried to its logical conclusion, an added segment $fs^{10}$ and corresponding parts should be provided for full 90° advancement.

This lag may also be corrected for by adjustments in the positioning of the contacts $bb$, $bb'$ ... $bb^9$ along the resistance BR.

Another refinement provides means for overlapping times of engagement and disengagement of the bridge contact which is being actuated and the bridge contact which is being released. This is accomplished by making these contacts ($bb$, $bb'$ ... $bb^9$) spring contacts so positioned (vertically) that first contact with the resistance BR is made approximately mid-way of travel from fully released position to fully engaged position. Approximately the mid-point is specified on the assumption that the pulling coil $pc$, $pc'$ ... $pc^9$ moves the armature of the respective contact solenoid $cs$, $cs'$ ... $cs^9$ into the engaged position at about the same speed that the return positioning spring (not illustrated) moves the armature of the solenoid into the disengaged position. Actually on this assumption the spring contacts should be so positioned as to make (and break) contact with resistance BR just short of one-half down travel. This eliminates what would otherwise be a short time period in which no bridge contact $bb$, $bb'$ ... $bb^9$ would be in engagement with the resistance BR. Otherwise, under such a condition of no contact engagement for a very short time, the bridge circuit would interrupt any uncompleted adjusting run of motor 329. Such interruption is eliminated by this refinement.

Now let us consider reverse operation i.e., when D is rotating in the counterclockwise direction. Under this condition the double pole-double throw switch 381 will be automatically shifted from the position shown in Figs. 5 and 5b to the alternative position by the means illustrated in Fig. 5b and previously described. Thus the contact solenoids $cs$, $cs'$ ... $cs^9$ will call for the motor 329 to drive the sleeve 56 in a direction opposite to that called for under the conditions of forward operation. Also, times of equal r.p.m.'s will occur when one of the arms 324, 324' 324$^2$ or 324$^3$ is opposite the contact segments $rs$, $rs'$ ... $rs^9$, rather than when one of said arms is opposite the contact segments $fs$, $fs'$ ... $fs^9$ as would be the case under forward operation. As pointed out above, the correspondingly numbered segments of the two series are electrically connected. Also, it will be apparent that rotation for advancement or retardment under the condition of reverse operation will be in the opposite sense to that required under the condition of forward operation. Thus, for example, whereas under forward operation for a requirement of 50° advancement, contact segment $fs$—$rs$ is positioned at 310°; under reverse operation for a requirement of 50° advancement contact segment $fs$—$rs$ will be positioned at 50°.

While several individual batteries have been indicated for convenience of illustration, their functions may actually be performed by a single battery (parallel wiring) although it may be desirable to use a separate battery for the bridge circuit.

The means for governing time of initiation of accelerating periods and decelerating periods, just described and illustrated in Figs. 5, 5a, 5b, 5c and 6 may be modified as described below to accommodate advancements of times of initiation up to 180°, thus among other objectives accommodating the transient requirements above referred to. To this end arms 324' and 324$^3$ and the respectively corresponding brushes 323' and 323³, Fig. 5, are eliminated. (Alternatively either arm of each pair may be eliminated.) In addition the series of contact segments $fs, fs' \ldots fs^9$ is extended in the clockwise direction by their counterpart contact segments $fs^{10}, fs^{11} \ldots fs^{18}$, to complete an arc of approximately 180°. Similarly, the series of contact segments $rs, rs' \ldots rs^9$ is extended in the counterclockwise direction by their counterpart contact segments $rs^{10}, rs^{11} \ldots rs^{18}$ to complete an arc of approximately 180°. Contact segment $rs^{18}$ merges and is identical with contact segment $fs^{18}$. The conductor network; breaker solenoid series $bs, bs' \ldots bs^9$; bridge resistance BR; slide wire resistance 333; and their auxiliary parts are similarly expanded in the obvious manner to service the said added contact segments $fs^{10}, fs^{11} \ldots fs^{18}; rs^{10}, rs^{11} \ldots rs^{18}$.

In this modification there will be only two positioning signals for each revolution of the output shaft D in lieu of the four such positioning signals provided for in the unmodified form previously described.

In Fig. 7 is diagrammatically illustrated alternative means for rotating gear 58 and thus its integral sleeve 56 in automatic response to the direction and degree of rotation of sleeve 56 called for by each of the contacts 350, 351 . . . 359 (counterparts of the bridge contacts $bb, bb' \ldots bb^9$ of Fig. 5) when the corresponding armature of the respective contact solenoid $cs, cs' \ldots cs^9$ is held in its down position (for example $bb^5$, Fig. 5) by its respective holding coil $hc, hc' \ldots hc^9$.

In Fig. 7, the said contact solenoids $cs, cs' \ldots cs^9$ are disposed in a line parallel to the motor shaft extension 332' (a counterpart of shaft extension 332 of Fig. 5, but threaded in the opposite sense). In the alternative means of Fig. 7, contact segments $rs', rs^2 \ldots rs^9$ are not electrically connected to contact segments $fs', fs^2 \ldots fs^9$; but, by means of an additional circuit network and solenoid system which is a mirror image counterpart extension of that illustrated in Fig. 5, control another set of contacts 361, 362 . . . 369 disposed as illustrated in Fig. 7, parallel to the motor shaft extension 332'.

A segmented electrical conductor 370 is also disposed parallel to said shaft extension 332'. Each of the gaps in the segmented electrical conductor 370 is selectively electrically opened or closed by the respective switch formed by the respective pair of contacts 350—350', 351—351' . . . 359—359'; 361—361'; 362—362' . . . 369—369'. The contacts 350, 351 . . . 359; 361, 362 . . . 369 are respectively actuated by their corresponding contacts solenoids $cs, cs' \ldots cs^9; cs^{11}, cs^{12} \ldots cs^{19}$. When the armature of one of said contact solenoids is held in its down position said respective gap in the segmented conductor 370 is electrically open while all of the other gaps in said conductor 370 are electrically closed; since (as previously explained with reference to Fig. 5) only one armature of the contact solenoids $cs, cs' \ldots cs^9; cs^{11}, cs^{12} \ldots cs^{19}$ can be held in its down position at any specific time.

The slider contact 330' is carried by a contact carrier 331' having an internally threaded opening through which a threaded extension 332' of the shaft 328 of the motor 329 is threaded. The contact 330' is held in electrical contact with the segmented conductor 370 and is somewhat wider than each of the gaps in said segmented conductor 370. Consequently, contact 330' will at all times be in electrical contact with some part of the segmented conductor 370. Said contact 330' is electrically connected through a source of current 375 to one end of each of the solenoids 371 and 372. The opposite end of solenoid 371 is electrically connected to the right hand end (end most remote from the motor 329, Fig. 7) of the segmented conductor 370. Similarly, the other end of the solenoid 372 is connected to the left hand end (end nearest the motor 329) of the segmented conductor 370. The solenoid armature 373 carries a contact 336 connected to one terminal of a source of motor energizing current 337. The second terminal of the source 337 is connected to the neutral terminal 338 of the reversible motor 329. The other two terminals 339 and 340 of the motor 329 are respectively connected to the stationary contact 339' and 340' at opposite sides of the movable contact 336 carried by a solenoid armature 373.

When the movable contact 336 is in electrical contact with the stationary contact 339' it will cause the motor 329 to rotate in the direction which will move the contact carrier 331' and its integral contact 330' to the left (toward motor 329) and thus rotate gear 58 and its integral sleeve 56 in a counterclockwise direction.

Conversely, when the movable contact 336 is in electrical contact with the stationary contact 340' it will cause the motor 329 to rotate in the direction to move the contact carrier 331' and its integral contact 330' to the right (away from motor 329) and thus rotate gear 58 and its integral sleeve 56 in a clockwise direction.

It will be apparent that selection of which of the solenoid coils 371 or 372 is to be energized, will depend upon which side of an electrically open gap in the segmented conductor 370 is positioned the contact 330'. For example, in the case illustrated in Fig. 7, only the solenoid armature of contact solenoid $cs^6$ is held in its down position, while all of the other solenoid armatures are held in their up positions. Consequently, only the switch 355—355' of the series is open, while all of the other corresponding switches are closed. Consequently, only the gap (in the segmented conductor 370) controlled by the contact solenoid $cs^6$ is open. Therefore, the circuit through solenoid coil 372 is open while the circuit through solenoid coil 371 is closed. Consequently, the motor energizing circuit through motor terminal 339 is closed, thus causing the motor 329 to rotate in the direction which will move contact 331' and its associated carrier 330' to the left i.e., toward the open gap controlled by contact solenoid $cs^5$. This action will continue until the contact 330' is carried across (to the left of) the gap. When contact 330' is carried across said gap, the circuit through solenoid coil 371 is opened and the circuit through solenoid coil 372 is closed, thereby bringing the movable contact 336 into electrical contact with the stationary contact 340', thus closing the motor energizing circuit through motor terminal 340 (and opening the motor energizing circuit through terminal 339) and thereby causing the motor to reverse its direction and to rotate in the direction which will move contact carrier 331' to the right. This "hunting" will result in contact carrier 331' and contact 330' being approximately positioned at a point just opposite the electrically open gap. While this undesirable feature of "hunting" can be largely eliminated by standard means, in the interest of simplicity this minor refinement is not illustrated.

While my invention for rotating a crank shaft will function without any means for varying or governing time of initiation of accelerating or working periods and decelerating or loafing periods of the individual engines, the efficiency of the overall power plant and the rotative speed range of the output shaft D will be vastly increased by said means for varying or governing said time of initiation.

The preferred form of proportioning the links, illustrated in Fig. 2 and described above, may be materially departed from without vitiating the action of the means described above for governing time of initiation of accelerating or working periods and decelerating or loafing periods. If such design changes are so excessive as materially to alter the efficiency of the power plant unless compensated for, such compensation may be accomplished by suitable biasing of bridge resistance BR, Fig. 5, with relation to the contacts 388, 388', bb, bb' . . . $bb^9$. Similar biasing has been described above.

Overall master throttling of the fuel to each of the individual engines A, A', A² and A³ is provided as diagrammatically illustrated in Fig. 1 and described in detail later in respect to its use with the form of my invention illustrated in Figs. 11 and 14. In that form the throttling control is identical with the throttling control in the form of my invention illustrated in Fig. 1.

The load L, illustrated in Fig. 1 and the function of which has been explained in detail above, is broken down into its component parts and diagrammatically illustrated in more detail in Fig. 8. The individual generator, water pump, oil pump and cooling fan with its associated radiator, ordinarily associated with an individual engine, are respectively replaced as illustrated in Fig. 8 by a single generator 400, a single water pump 401, a single oil pump 402, and a single cooling fan 403 (with its single radiator 404); each serving all of the engines A, A', $A^2$ and $A^3$ and each driven by the shaft $o^7$ of the differential gear train O', Fig. 1 (or alternatively by shaft $m$, Fig. 1a).

The generator 400 is chain driven by shaft $o^7$ in standard fashion as illustrated in Fig. 8. The water pump 401 is a centrifugal pump, belt driven by shaft $o^7$. The oil pump 402 is a gear pump, gear driven by shaft $o^7$. The cooling fan 403, mounted in standard fashion relative to its associated radiator 404, is belt driven by shaft $o^7$.

As illustrated in Fig. 8, the flow from the water pump 401 to the individual engine jackets of the engines A, A', $A^2$ and $A^3$ is through water lines 410 and 411, then through subsidiary water lines 412, 412a, 412b and 412c. The line 410 supplies through subsidiary lines 412 and 412a water for the cooling of engines A and A'; while line 411 supplies through the subsidiary lines 412b and 412c water for the cooling of engines $A^2$ and $A^3$. The return flow of water from each of the individual engine water jackets is by way of subsidiary water lines 413, 413a, 413b and 413c from each of the engines A, A', $A^2$ and $A^3$ respectively to the return water line or manifold 414 which in turn delivers to the return water line 415 which at its other end delivers the water to the top of the radiator 404. From the bottom of the radiator the cooled water is conducted to the intake end of the water pump 401 by way of the water line 416.

As illustrated in Figs. 8 and 9, the flow of oil from the oil pump 402 to the individual internal lubricating systems of the individual engines A, A', $A^2$ and $A^3$, is from the discharge end of the oil pump 402 into the oil line or manifold 420, thence into the subsidiary oil lines 421, 421a, 421b and 421c and thence respectively into the individual internal lubricating systems of the engines A, A', $A^2$ and $A^3$. The return flow of oil from each of the individual engine oil sumps is by way of subsidiary oil lines 422, 422a, 422b and 422c from each of the engines A, A', $A^2$ and $A^3$ respectively to the return water line or manifold 423 which in turn delivers to the intake end of the oil pump 402.

When, as illustrated in Figs. 8 and 9, no means are provided for dividing oil flow and water flow between the individual engines in proportion to their respective rotative speeds (r.p.m.'s) of shafts $a$, $a'$, $a^2$ and $a^3$); it is necessary for the oil system and the water system to be of larger capacity than otherwise would be the case in order to provide proper lubrication and cooling of the high speed engine of a pair while the other engine of the pair is running at low speed or minimum idling speed for a substantial period of time as will be the case when starting to rotate shaft D under maximum load, or when shaft D is rotating at very slow speeds (r.p.m.'s) under heavy load. This necessity for excess capacity of the oil system and of the water system may be reduced or eliminated by providing means, as illustrated in Fig. 10, for dividing the flow of oil and the flow of water between the engines in proportion to the respective rotative speeds (r.p.m.'s of shafts $a$, $a'$, $a^2$ and $a^3$) of the engines A, A', $A^2$ and $A^3$. Said proportioning means may be rendered inoperative at comparatively high speeds of the output shaft D, although that is not provided for in the case of the means illustrated in Fig. 10 and described below.

As illustrated in Fig. 10, a standard throttle valve, for example of the type illustrated and described on page 375 of Elementary Steam Power Engineering by McNaughton (third edition), is installed in each of the subsidiary water flow lines 412, 412a, 412b and 412c; and in each of the subsidiary oil flow lines 421, 421a, 421b and 421c. Said throttle valve 430 is automatically adjusted to vary the amount of fluid flow permitted by raising and lowering the valve spindle 431—in automatic response to the rotative speed of the flyball governor 432.

A bracket 433 attached to the upper part of the valve body 434 carries a horizontal bearing 435 for the gear shaft 436, a vertical bearing for the sleeve 437 and a chamber to which the adjusting lever 438 is attached. The arm supporting the governor balls 439 are pivoted by pivots 440 to the upper parts of the sleeve 437 and revolve with said sleeve. A bevel gear 441 is keyed to the lower part of the sleeve 437 and meshes with a similar bevel gear 442 on the gear shaft 436. On the other end of said gear shaft 436 is mounted bevel gear 443 which in turn meshes with bevel gear 444 mounted on and coaxial with shaft $a$ of engine A.

With an increase in the rotative speed of engine A, the speed of rotation of governor balls 439 is increased. Centrifugal forces cause them to move outward and upward against the forces of gravity and the force of control spring 445. The inner end of the arms 446 of the governor balls 439 thus press down upon the valve spindle 431 lowering the balanced valve 448 and partly opening or increasing the opening of the passages through valve 434 thus permitting or increasing flow of fluid. The balanced valve 448 has an upper disk 448a and a lower disk 448b. Fluid pressure from the inlet side of the valve 430 acts on the top of the upper disk 448a and on the bottom of the lower disk 448b. Fluid pressure from the outlet side of the valve 430 acts on the outlet side of both disks. Therefore, the valve 448 is balanced and moves easily. In like manner a decrease in rotative speed of shaft $a$ causes the balls 439 to be lowered and the valve spindle 431 integral with balance valve 448 to be raised thus partly closing or closing the passages through valve 430. Thus it will be apparent that the rate of fluid flow through the valve 430 will be in proportion to the rotative speed of the shaft $a$ of engine A. However, it is to be noted that preferably, as illustrated in Fig. 10, the balanced valve 448 of the throttle valve 430 will not be quite fully closed when shaft $a$ is not rotating and the governor balls 439 are in extreme downward position.

Similar valves with similar control means are installed in each of the subsidiary water lines 412, 412a, 412b and 412c with the respective governor 432 being respectively driven by the shafts $a$, $a'$, $a^2$ and $a^3$ respectively of the engines A, A', $A^2$ and $A^3$.

Also similar valves with similar control means and similar driving means are installed in each of the subsidiary oil lines 421, 421a, 421b and 421c.

Thus it will be apparent that the flow of oil and the flow of water will be divided between the engines A, A', $A^2$ and $A^3$ in proportion to the respective speeds (r.p.m.'s of shaft $a$, $a'$, $a^2$ and $a^3$) of the engines A, A', $A^2$ and $A^3$.

Figure 11:
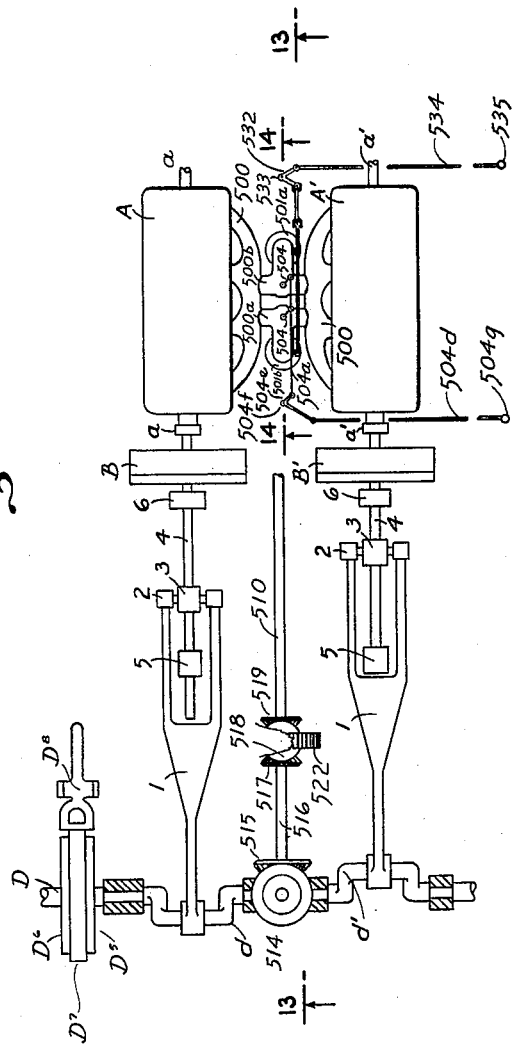
Fig. 11 is a partial plan view of a modification of apparatus shown in Fig. 1, diagrammatically illustrating automatic means for controlling the fuel supply of the individual engines.
Figure 13:
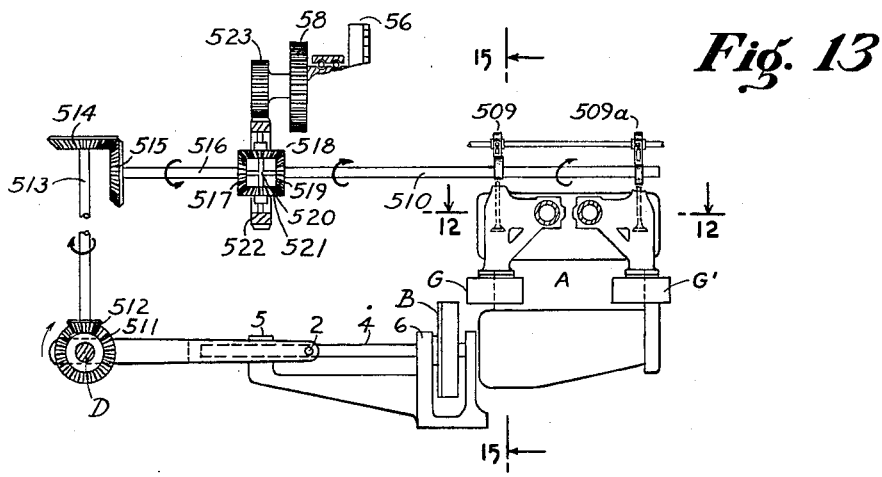
Fig. 13 is a section on the line 13—13 of Fig. 11.
Figure 12:
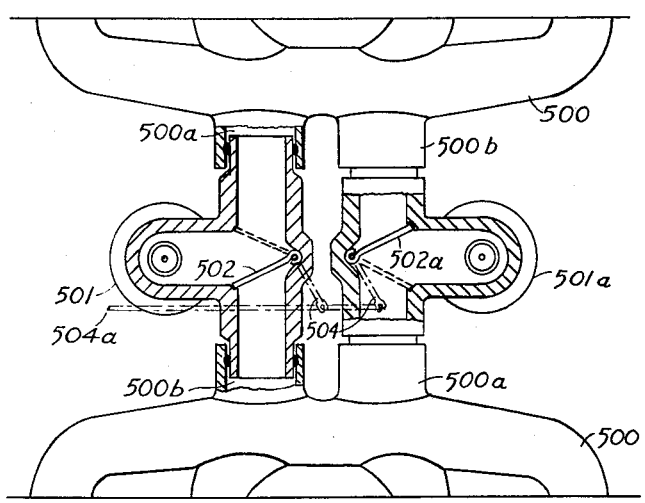
Fig. 12 is a large scale plan section on the line 12—12 of Fig. 13.

In the embodiment of the invention illustrated in Figs. 11, 12, 13, 14 and 15, each of the engines A, A', $A^2$ and $A^3$ of Fig. 1 is provided with a separate manifold 500 with separate outlets to the different engine cylinders. Each manifold 500 has two fuel inlets, 500a and 500b, which are connected to different carburetors. As shown in Figs. 11 and 12, the carburetor 501 supplies fuel to the manifold inlet 500a of the engine A when the output shaft D is being rotated in the normal or forward direction, clockwise as seen in Fig. 13, and the carburetor 501a then supplies fuel to the engine A' through its fuel inlet 500a. When the rotation of shaft D is reversed, the carburetor 501a supplies fuel to the engine A through its manifold inlet 500b, and the carburetor 501 then supplies fuel to the engine A' through its manifold inlet 500b. Similarly, the engines A² and A³ are supplied with fuel for operation in the forward and reverse directions of shaft D by a second pair of carburetors 501b and 501c. As shown in Figs. 11 and 12, the carburetors 501 and 501a are arranged between the engines A and A', as are the manifolds 500 for both engines. Similarly the carburetors 501b and 501c and the manifolds 500 for the engines A² and A³, are arranged between those engines. The carburetors 501b and 501c may be exactly like the carburetors 501 and 501a, and supply fuel to the engines A² and A³ for forward and reverse operation through manifold inlets 500a and 500b connected to the carburetor 501b and 501c just as the inlets 500a and 500b of the engines A and A' are connected to the first mentioned carburetors 501 and 501a.

Figure 14:
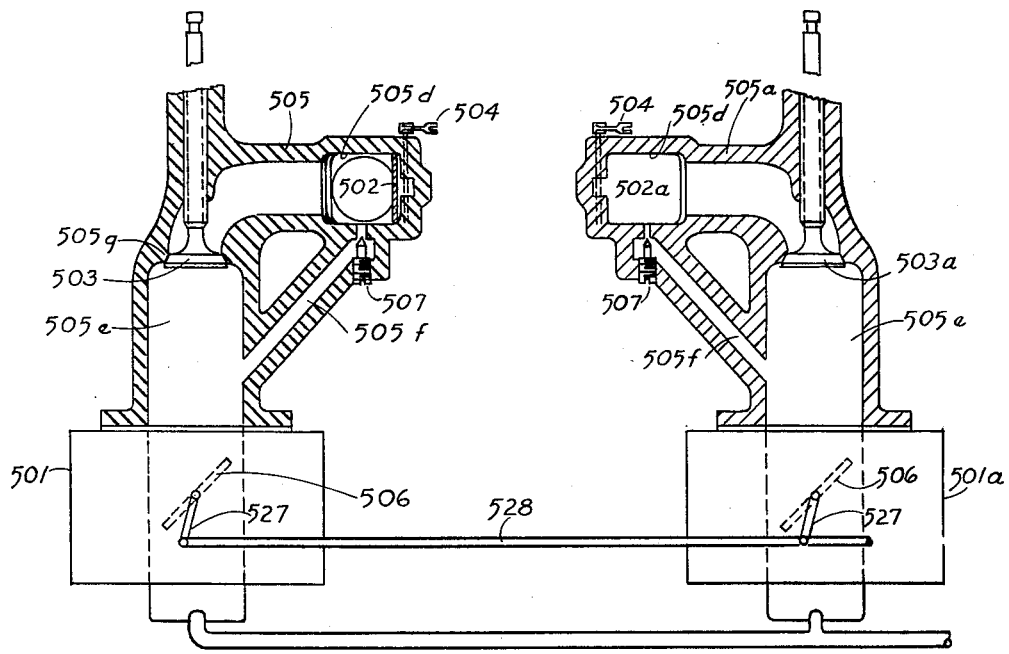
Fig. 14 is a large scale section on the line 14—14 of Fig. 11.

During operation in the forward direction communication between the carburetors 501 and 501a and the inlets 500b of the engines A and A' are closed by reversing valves 502 and 502a, respectively as is shown in Figs. 12 and 14. For reverse operation, the valves 502 and 502a are angularly adjusted into positions in which they close communication between the carburetors 501 and 501a and the inlets 500a for the engines A and A' respectively. Two reversing valves not shown but respectively similar to the valves 502 and 502a, similarly control communication between the carburetors 501b and 501c and the inlets 500a and 500b of the engines A² and A³, respectively. Each reversing valve has an operating arm 504 angularly adjustable to shift the valve between its two operating positions. For simultaneous operation the four valve arms 504 are angularly adjustable to shift the valve mechanism by means diagrammatically shown as comprising links 504a and 504b through which the arms 504 are pivotally connected to angular levers 504e. The latter are mounted to turn about intermediate pivots 504f and may be angularly adjusted by the reciprocating rod 504d which has a handle 504g at the end remote from the levers 504e.

Each reversing valve is mounted in a valve chamber 505d formed in a corresponding pipe section 505, 505a, 505b or 505c, which comprises a main passage 505e and a by-pass 505f through which fuel, admixed with air, may pass from the associated carburetor to the corresponding valve chamber, 505d. As shown in Figs. 12 and 14, the pipe section 505 has its passages 505e and 505f arranged to communicate with the carburetor 501, and has its reversing valve chamber 505d arranged to communicate with the inlet 500a to the manifold 500 for the engine A and the inlet 500b of the manifold for the engine A'. The main passage 505e in the section 505 comprises an uprising portion open at its lower end to the carburetor 501, and a horizontal upper portion open at one end to the chamber 505d and formed in its curved central portion with a seat 505g for a poppet valve 503. The latter has a vertical stem portion extending through the wall of the passage 505e as shown in Fig. 14.

As shown in Fig. 14, a hand operated butterfly valve 506 is mounted in each of the carburetors 501 and 501a (and though not shown, also in the carburetors 501b and 501c). The valve 506 is used as a throttling valve to manually regulate the flow through the passage 505e when the valve 503 is in its open position. As shown in Figs. 11 and 14, each of the butterfly valves 506 has an operating arm 527 angularly adjustable to rotate each of said butterfly valves 506 about its axis and thereby control the rate of fuel delivery to the main passages 505e and incidentally the by-passes 505f, butterfly valve 506 being the conventional throttling valve of an internal combustion engine. For simultaneous operation the four valve arms 527 are angularly adjustable by means diagrammatically shown as comprising links 528, through which the arms 527 are connected through the universal joints 529 to the rods 530, which rods 530 in turn are respectively connected through universal joints 531 to one end of the angular levers 532. The latter are mounted to turn about intermediate pivots 533 and may be angularly adjusted by the reciprocating rod 534 which has a handle 535 at the end remote from the levers 532.

The passage 505f forms a by-pass about the valve 503 in the pipe section 505 to pass a small amount of fuel to the valve chamber 505d when the valve 503 is closed, and thereby prevent an engine stalling action which might otherwise occur under a low speed operating condition. The volume of flow through each of the passages 505f may be manually regulated by a corresponding needle valve 507. The flow through the passage 505f may be cut off by automatic means until the rotative speed of the respective engine falls to a predetermined idling speed, after the fashion described above for the form of my invention in which ignition control rather than fuel control is the means by which the accelerating or working periods and decelerating or loafing periods are initiated and terminated.

In the normal operation of the apparatus shown in Figs. 11, 12, 13, 14 and 15, during slow speed rotation of shaft D each of the various valves 503, 503a, 503b and 503c is closed during nearly all or a large portion of each of the half revolutions of the shaft D in which the draw bar 4 of the engine to which the valve pertains is moving toward the output shaft D. The resultant interruption or reduction in the supply of fuel to each of the engines during the successive periods in which the corresponding sliding bar 4 is moving toward the shaft D, tends to, and normally does make the average engine speed during that period lower than the average engine speed during the intervening periods in which the engine is moving the member 4 away from the shaft D. The alternating engine speed variations make the average centrifugal force action on the weights C and C' included in each flywheel, Fig. 2, greater during the periods in which the force transmitted from the weights to the shaft D through the corresponding connecting rod 1 tends to maintain the rotation of said shaft, than during the alternating periods in which said force opposes the rotation of the shaft D.

In general, during slow speed rotation of shaft D, each of the valves 503, 503a, 503b and 503c should open at or about the beginning of the half-revolution of the output shaft D during which the sliding bar 4 associated with the corresponding engine is moving away from the shaft D, and should close at or about the beginning of each half-revolution of the shaft D in which said bar 4 is moving toward the output shaft D. In operation with a relatively slow output shaft speed, each of said valves 503, 503a, 503b and 503c may open and close at almost the precise instants at which the corresponding crank portion d, d', d² or d³ moves through its neutral positions. Under some conditions, however, and particularly when the speed of the output shaft D is relatively high, each of the valves 503, 503a, 503b and 503c may advantageously be opened and closed sometimes prior to the beginning of the half-revolution away from and toward the output shaft. The advance thus made in the opening and closing adjustments of each of the valves 503, 503a, 503b and 503c, may be controlled by the means for governing time of initiation of accelerating and decelerating periods previously described with respect to Figs. 5, 5a, 5b, 5c, 6 and 7, the application of which to the valve actuating mechanism here under discussion will be described immediately subsequent to the explanation of this valve actuating mechanism.

The mechanism employed to move the cut-off valves 503, 503a, 503b and 503c between their respective open and closed positions in suitably timed relation with the movements of the corresponding crank portion d, d', d² and $d^3$ of the shaft D, may take various forms. In the form shown in Figs. 11, 12, 13, 14 and 15, said mechanism is wholly mechanical, with the exception of the means for governing time of initiation of accelerating or working periods and decelerating or loafing periods of the individual engines, the function of which governing means is the advancement (or retardment) of said time of initiation. Said governing means has been described above.

Figure 15:
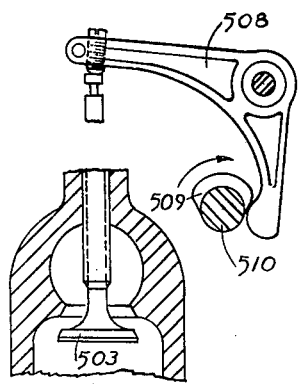
Fig. 15 is a section on the line 15—15 of Fig. 13.

Each of the poppet valves 503, 503a, 503b and 503c is actuated by its corresponding rocker arm 508, 508a, 508b and 508c. For simplicity of description first will be described the operation of one of these valves only— 503 of Figs. 13, 14 and 15. Rocker arm 508, Fig. 15, is actuated by cam 509 which is integrally fixed with cam shaft 510, Figs. 13 and 15, rotating clockwise i.e., in the direction of the solid line arrow as viewed in Fig. 15. This is a standard mechanism for controlling poppet valves such as exhaust valves and intake valves in internal combustion engines. Cam shaft 510 is driven by output shaft D by means of bevel gear 511 which is integral and coaxial with output shaft D. Said bevel gear 511 meshes with bevel gear 512 which is integral with vertical shaft 513 which carries at its upper end bevel gear 514 which in turn meshes with bevel gear 515. The horizontal shaft 516 carries the bevel gear 515 at one end and at the opposite end carries bevel gear 517 which is part of a differential mechanism 518. Horizontal shaft 516 is coaxial with cam shaft 510. Cam shaft 510 carries at the end closest to output shaft D a bevel gear 519 which is also a part of the differential mechanism 518. This is a standard differential mechanism of the type which has been described in detail in connection with the description of the differential mechanism 0, Fig. 1. Thus, the horizontal shaft 516 and the cam shaft 510 are respectively integral with two aligned bevel gears 517 and 519 of the differential mechanism 518 which includes a rotatable driving element 520 which is coaxial with said bevel gears 517 and 519. The rotatable element 520 supports one or more bevel gears 521 meshing with each of the gears 517 and 519, each of said gears 521 rotating about an axis radial to the axis of rotation of the element 520. Those parts of the element 520 which form the axes of rotation of the bevel gears 521 are prolonged to support a ring gear 522 which is thus integral with the element 520. Ring gear 522 meshes with spur gear 523 which is mounted integrally with and associated with worm gear 58, of the means for governing time of initiation of accelerating or working periods and decelerating or loafing periods, depicted in Fig. 5 and previously described. The gear ratio between ring gear 522 and spur gear 523 is 2:1. The ratio between gears 511 and 512 and between gears 514 and 515 is 1:1.

Thus it will be apparent that with spur gear 523 held in a fixed position and with output shaft D rotating in a clockwise direction as indicated in Fig. 13 (forward operation), that cam shaft 510 will rotate in a clockwise direction as viewed in Fig. 15. Cam 509 carried by cam shaft 510 is so proportioned as to keep valve 503 fully open for nearly one-half revolution of the cam shaft 510 and to keep valve 503 fully closed for nearly one-half revolution of the cam shaft 510. In the form shown, from the point one-half way through the opening operation to the point one-half way through the closing operation is 180°. With crank arm $d$ positioned at 0° (frame of reference previously described) as shown in Fig. 13, cam 509 is positioned as shown in Fig. 15 and is at the position which is just one-half way through the valve opening operation of valve 503. Cam 509a which operates the valve opening mechanism associated with valve 503a is 180° out of phase with cam 509 and (the cams being symmetrical) is at this time at the position which is one-half way through the valve closing operation for valve 503a.

Thus it will be apparent that time of initiation of accelerating or working periods and decelerating or loafing periods occurs approximately at the 0° and 180° positions if we accept the one-half open and one-half closed positions as approximately marking said times of initiation. Regardless of whether said mid-point is used as an index of time of initiation of said periods, said time of initiation may be adjusted by angular rotation of ring gear 522 about its axis. By virtue of the differential mechanism 518 previously described it will be apparent that angular rotation of ring gear 522 relative to horizontal shaft 516 will result in an angular rotation of cam shaft 510 in the same direction by an amount just twice that of the amount of rotation of ring gear 522, relative to horizontal shaft 516. Thus rotation of ring gear 522 in the direction of rotation of cam shaft 510 will result in advancement of said time of initiation of accelerating or working periods and decelerating or loafing periods; while rotation of ring gear 522 in the direction opposite to the direction of rotation of cam shaft 510 will result in a retardment of said time of initiation. Thus it will be apparent that the previously described governor of time of initiation of accelerating or working periods and decelerating or loafing periods (Figs. 5, 5a, 5b, 5c, 6 and 7) will function through spur gear 523 to control said times of initiation in such fashion as to fix time of equal speeds of rotation (r.p.m.'s) of the pair of engines A and A' at approximately the 0° and 180° positions.

Actuation and control of the valves 503b and 503c associated with engines $A^2$ and $A^3$, is accomplished by means identical with that just described for actuation and control of the valves 503 and 503a associated with engines A and A'. The cams 509b and 509c respectively associated with the valves 503b and 503c are 90° out of phase with the cams 509 and 509a respectively associated with the valves 503 and 503a.

Figure 16:
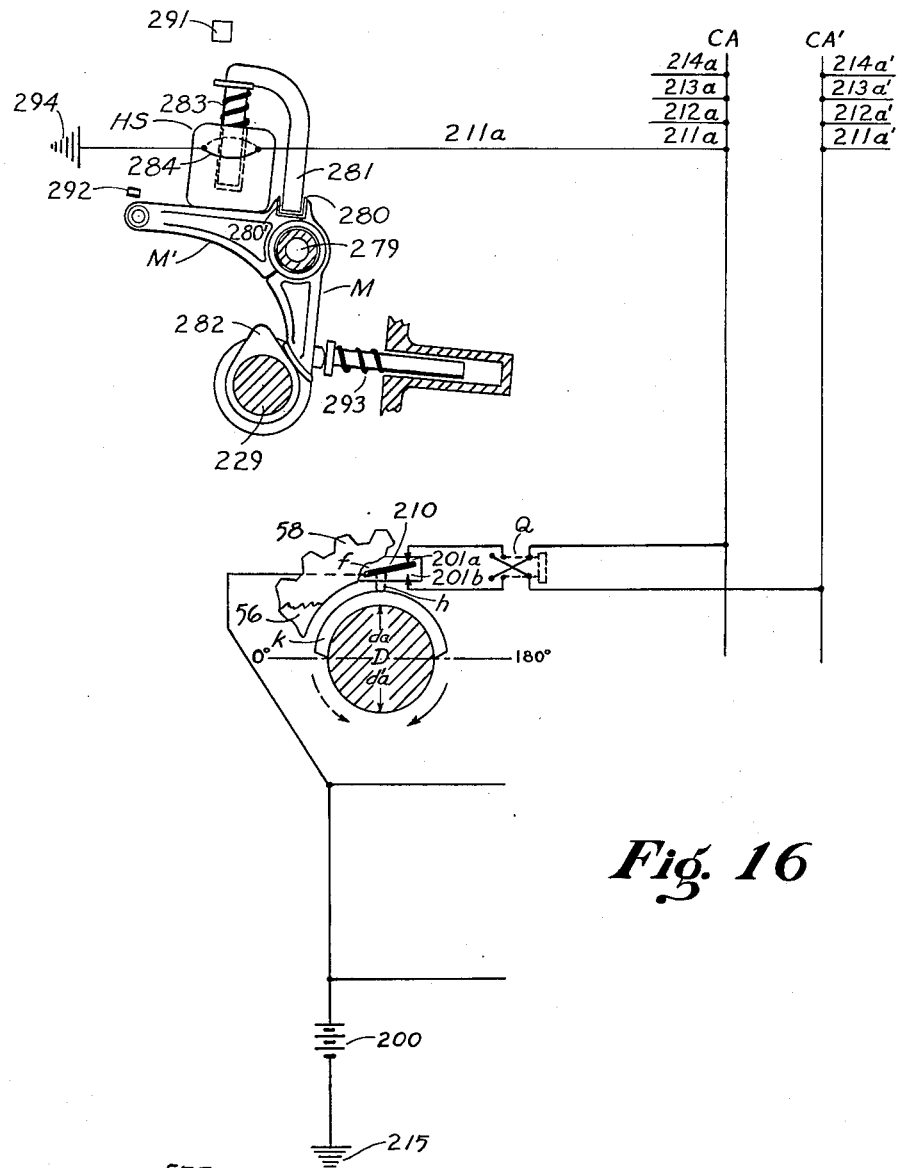
Fig. 16 is a diagrammatic view illustrating apparatus alternative in part to that illustrated in Fig. 4 and also alternative to that illustrated in Figs. 11, 12, 13, 14 and 15.

There has been previously described relative to Figs. 4 and 4a, means for prevention of fuel waste during the decelerating or loafing periods of an engine in that form of my invention which uses ignition circuit control to provide the previously described accelerating or working periods and decelerating or loafing periods. In the alternative form described below, such fuel waste is prevented by rendering the intake valves of the respective engine inoperative during the period in which the ignition circuit of that engine is inoperative. To that end, means are provided as illustrated in Fig. 16, wherein is shown a modified form of a standard mechanism for actuating and controlling an intake valve of an engine. This standard mechanism is modified as indicated in Fig. 16 by cutting the rocker arm into two portions M and M' each mounted on the same pin 279 on which the rocker arm is mounted in the unmodified form. Near the pin or bearing end of each half rocker arm M and M' is a recess, respectively 280 and 280'. A pawl 281 may be selectively engaged or disengaged from this notch jointly provided by the recesses 280 and 280'. When the pawl 281 is thus engaged in the notch 280—280', then the compound rocker arm M—M' acts as a unit rocker arm just as in the unmodified standard case. When the pawl 281 is disengaged from the notch 280—280', then actuation of the half rocker arm M by the cam 282 does not actuate the half rocker arm M'. The pawl 281 is actuated by the "push-in" solenoid HS which is mounted on, and integral with, the half rocker arm M'. The spring backed plunger 293 keeps half rocker arm M in engagement with cam 282 which is integral with the cam shaft 279. Stop 291 limits the upward movement of armature 285. Stop 282 limits the upward movement of half rocker arm M'.

In Fig. 16, the spring 283 is a compression spring which acts to disengage the pawl 281 from the notch 280—280'; while the pulling coil 284 (of the "push-in" solenoid HS) when energized is sufficiently powerful to pull the armature 285 and thus pawl 281 down and engage it in the notch 280—280' against the opposing lifting or disengaging force of the spring 283.

The lead 211a connects directly from one terminal of the pulling coil 284 to the circuit CA and thus to switch 201a. The other terminal of the pulling coil 284 is connected to ground 294. Consequently, it will be apparent that when circuit CA is energized (firing condition for cylinders of engine A) that circuit 211a will also be energized thus energizing pulling coil 284 and engaging pawl 281 in the notch 280—280'.

The three additional circuits 212a, 213a and 214a in combination with circuit CA each control exactly similar mechanism to that described above and thereby each controls the similar events of one of the other of the four cylinders of the engine A. The similar events of the engine A' are controlled in a manner parallel to that described for engine A.

It will be apparent that circuit CA' and circuits 211a', 212a', 213a' and 214a' will operate synchronously with and substantially 180° out of phase with their corresponding circuits CA and 211a, 212a, 213a and 214a. In Fig. 16, da indicates the position of crank arm d (the crank arm of engine A) of Fig. 1 and d'a indicates the position of the crank arm d' (the crank arm of engine A') of Fig. 1 with respect to the cam k. As indicated, circuits CA' and 211a', 212a', 213a' and 214a' control the operation of engine A' in a manner exactly similar to the described manner in which circuits CA and 211a, 212a, 213a and 214a control engine A, but impose a timing of the critical events for engine A' 180° out of phase with the timing of the critical events for engine A.

It will be apparent that the form of intake valve control described above will function to provide the previously described accelerating or working periods and decelerating or loafing periods even though ignition control for that purpose is rendered inoperative by open circuiting circuits CA, CA', CA² and CA³ without open circuiting circuits 211a, 212a, 213a, 214a; 211a', 212a', 213a', 214a'; 211a², 212a², 213a², 214a²; and 211a³, 212a³, 213a³, 214a³. While it is true that this modified form will be operative, it is obvious that "sharpness" in fixing the "time of initiation" will be lost.

Advantageously, in some cases, at least, the shaft D is provided with a brake D⁵ to facilitate the starting of the power unit into operation and for other purposes. As diagrammatically shown in Fig. 1, the brake D⁵ is of conventional type comprising a brake disc D⁶ secured to the shaft D, a flexible brake band D⁷ surrounding the disc D⁶ and a pedal or hand lever D⁸ for tightening the brake band about the brake disc when a braking operation is desirable. The use of the brake D⁵ to hold shaft D against rotation preparatory to starting the power unit into operation, makes it possible to similarly warm up all of the engines A, A', A² and A³, and to bring them up to speed without undue delay and without wasting power by unnecessary movement of the shaft D under load. Advantageously, the brake disc D⁶ has sufficient mass and is properly proportioned to provide adequate flywheel action for the shaft D.

One advantage of being able to brake shaft D in warming up the engines arises from the fact that, in normal operation two of the engines A, A', A² and A³ will be in a decelerating or loafing period while the other two engines will be in an accelerating or working period for a given angular position of output shaft D. Thus for a given angular position of output shaft D, only the two engines in an accelerating or working period can be rapidly warmed up and brought up to high speed. Thereafter by releasing the brake D⁵ and allowing the shaft D to make an approximate half turn and then resetting the brake, it becomes possible to rapidly heat up the two engines previously in a decelerating or loafing period.

Figure 17:
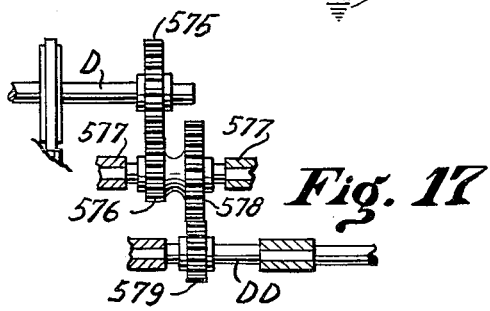
Fig. 17 is a plan diagrammatically illustrating gearing operatively connected to shaft D of Fig. 1.
Figure 24:
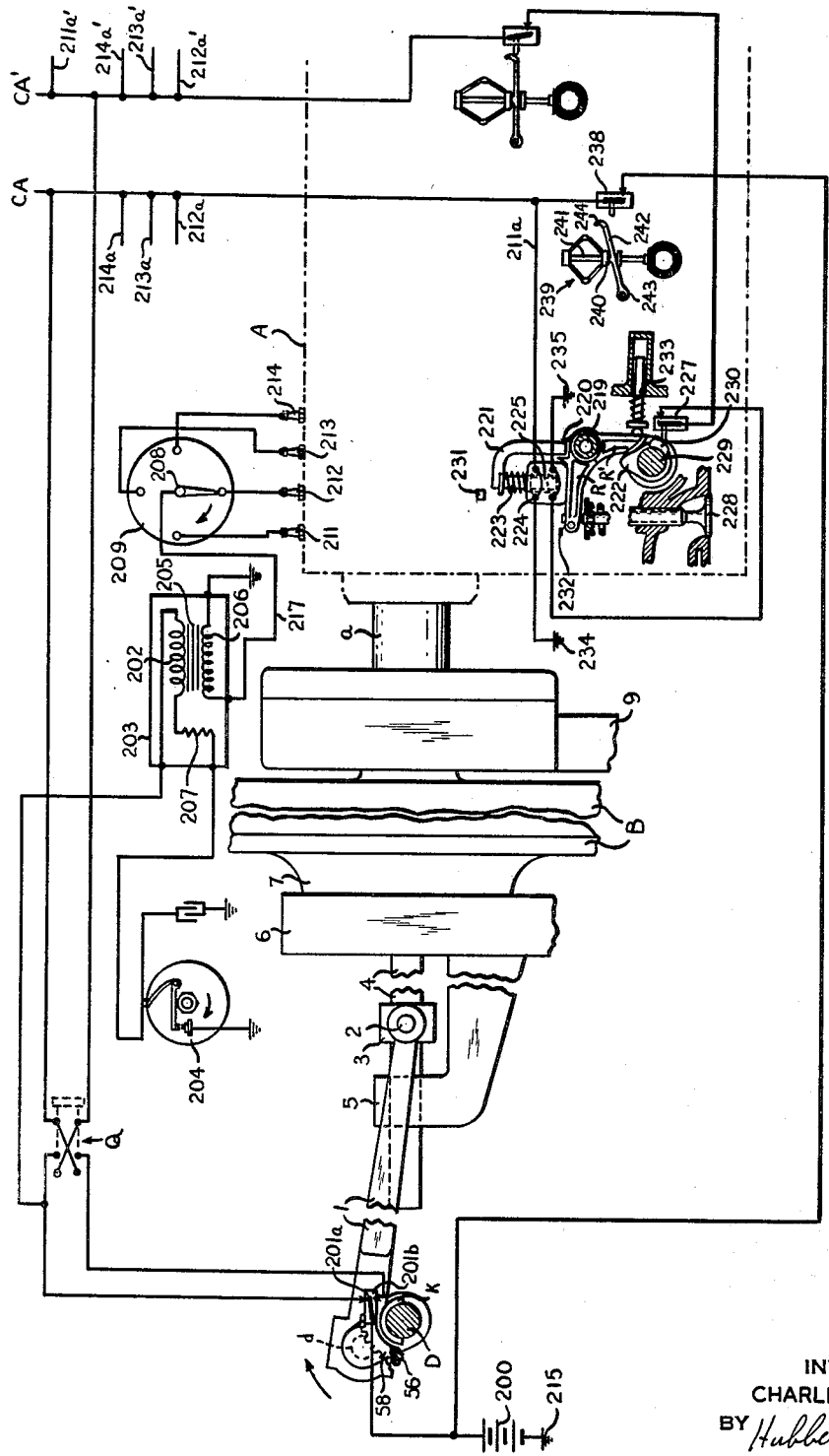
Fig. 24 is a diagrammatic view illustrating the interrelation of the several components of the apparatus for rotating a crank shaft and particularly interrelates Figs. 2, 3 and 4 of the drawings.

In some cases it may be advantageous to increase the speed range of the output shaft of the overall power plant. In such cases, as illustrated in Fig. 17, output shaft D of Fig. 1 may be arranged to drive an auxiliary output shaft DD through gears or a chain of gears so proportioned as to rotate auxiliary shaft DD at a higher speed and in a fixed ratio to the rotative speed of output shaft D. As shown in Fig. 17, spur gear 575 integral with output shaft D, meshes with spur gear 576 journalled in bearings 577, said spur gear 576 being of smaller diameter than spur gear 575. Integral with spur gear 576 is spur gear 578 which is of larger diameter than spur gear 576. Spur gear 578 in turn meshes with smaller diameter spur gear 579 which is integral with the auxiliary output shaft DD which in the case illustrated is the load bearing shaft of the overall power plant. The use of such gearing to increase the speed range of the load bearing shaft is at the cost of a reduction in the maximum starting torque which can be exerted by the load bearing shaft—in this case auxiliary output shaft DD as compared to output shaft D.

Conversely, when it is desired to increase the maximum starting torque which can be exerted by the load bearing shaft, the speed step-up chain of gears shown in Fig. 17 may be replaced by a speed step-down chain of gears in which spur gear 575 is of smaller diameter than spur gear 576; spur gear 578 is of smaller diameter than spur gear 576 and also smaller than spur gear 579. It should be noted that such increase in the maximum starting torque that can be exerted by the load bearing shaft is obtained at the expense of a reduction in the speed range of said load bearing shaft.

A more flexible variation of the gearing illustrated in Fig. 17 may be had by interposing between output shaft D and auxiliary shaft DD a standard set of change speed gears of the sliding type common in automobiles. Such a set of change speed gears may or may not have a clutch interposed between said set of change speed gears and output shaft D.

The flywheel used in the practice of my invention may take various forms. One modification of the flywheel best shown in Fig. 2, is illustrated in Figs. 18 and 19, and a second modification is illustrated in Figs. 20 and 21. In the flywheel BA illustrated in Figs. 18 and 19, the chambered body portion of the flywheel B of Fig. 2 is replaced by a disk or flange like part B¹⁰, secured to the engine shaft a. Each of the weights CC shown in Figs. 18 and 19, are connected to one end of an arm or link having its other end pivotally connected to the part B¹⁰. Each weight CC is also connected by a separate link to the collar 11A swiveled on the corresponding draw bar 4. In the flywheel shown in Figs. 18 and 19, the collective mass of the weights CC and their connections to the parts B¹⁰ and 11A, may be many times the mass of the part B¹⁰. The relative proportions and masses of the different flywheel parts, are not shown in Figs. 18 and 19, which in this respect are purely diagrammatic.

The flywheel BA shown in Figs. 18 and 19 includes three weights CC symmetrically spaced about the flywheel axis. Whether the aggregate mass or weight of the portion of each flywheel, movable toward and away from the axis of the flywheel, is divided in two sections as shown in Fig. 2, or into three sections as shown in Figs. 18 and 19, or comprises a single section or weight, or more than three sections or weights is theoretically unimportant for the purposes of the present invention. In practice of the use of a flywheel comprising a single movable weight such as would be formed, for example, by the omission of the weight C' of Fig. 2, would be open to the objection that the engine shaft a and the draw bar 4 would be subjected to severe lateral stresses as the single weight revolved about the flywheel axis. When the flywheel includes a plurality of separate weights, they may be proportioned and distributed about the flywheel axis so as to avoid unbalanced transverse stresses. In Figs. 18 and 19 each weight CC moves toward and away from the flywheel axis along a circular arc instead of in the purely radial direction as do the weights C and C' of the flywheel B shown in Fig. 2. For the general purposes of the present invention, however, there is no significant difference between the operation of the flywheels BA and B arising from the difference between the paths or movements toward or away from the flywheel axis of the weights CC and of the weights C and C'. For the general purpose of my invention the path of movement of the weights CC is substantially transverse to the flywheel axis.

The flywheel BB shown in Figs. 20 and 21 comprises a flange or disk portion $B^{11}$ carried by the engine shaft $a$. The disk $B^{11}$ differs from the disk $B^{10}$ of Figs. 18 and 19 primarily in that it comprises a part $B^{12}$ at its side adjacent the draw bar 4 which extends transversely away from the disk $B^{11}$ so that it serves as a guide for the links $B^{13}$ through which the flywheel weights CB and CB' are pivotally connected to the disk $B^{11}$ by a pivot $B^{15}$. As shown, each weight CB is rigidly connected to a similar weight CB' by a connecting shaft $CB^2$, and each pair of connected weights CB and CB' is connected to the pivot $B^{15}$ by a pair of links $B^{13}$ at opposite sides of the part $B^{12}$. The latter is shown as an arc of 180°, and is wedge shaped in cross section to provide arc-shaped guide surfaces for tapered antifriction rollers $B^{14}$, pivotly connected to the adjacent links $B^{13}$. Each pair of weights CB and CB' is connected by a pair of side by side links $B^{16}$ to a collar 11B swiveled on the corresponding draw bar 4. The flywheel BB is adapted to serve the general purposes of the invention just as they are served by the previously described flywheels B and BA. The links $B^{13}$ connecting the flywheel weights CB and CB' to the engine shaft $a$ are stiffened by their engagement with the part $B^{12}$ against lateral deflection on a change in the speed of rotation of the flywheel.

The number of the crank portions of the output shaft and their spacing may be varied. Thus as is shown by way of example in Fig. 23, the output shaft DA may include three crank portions $da$, $da'$ and $da^2$ spaced 120° apart about the axis of the shaft.

Whether the output shaft has three crank portions as shown in Fig. 23, or four as shown in Fig. 1, or has more than four or less than three crank portions, each crank portion may be connected to more than one flywheel. Thus as shown in Fig. 22, for example, the flywheels B and B' of engines A and A' of Fig. 1 may each be connected to the crank portion $d'$ of the output shaft D', and the flywheels $B^2$ and $B^3$ of the engines $A^2$ and $A^3$ may each be connected to the crank portion $d'$ which is displaced 90° from the portion $d$. As shown in Fig. 22, the axes of the flywheels B and B' are in alignment as are the axes of the flywheels $B^2$ and $B^3$. Thus with only two crank portions the shaft D' may be at all times subjected to a torque resultant tending to rotate the shaft in the desired direction.

It will also be apparent that in a rudimentary form of my invention, only one engine and one crank arm of the output shaft D may be employed. Such a single engine form of the invention will bear somewhat the same relationship to the multiengine forms of my invention that a single cylinder steam engine bears to a multicylinder steam engine. The analogy is quite close.

Obviously, critical and essential steps in my method of rotating a crank shaft may be performed by hand. For example, at low rotative speeds of the output shaft D, Fig. 1, accelerating or working periods and decelerating or loafing periods may be initiated by hand operation of the switch 201, Fig. 3, in the ignition circuits of the engines A, A', $A^2$ and $A^3$, Fig. 1. Operator can determine the time at which to manually open and close these switches by visual observation of the angular position of any or all of the crank arms $d$, $d'$, $d^2$ and $d^3$, Fig. 1. Obviously, the operator will be able to provide for advancement (or retardment) of said time of initiation of accelerating or working periods and decelerating or loafing periods by such visual observation of the position of said crank arms $d$, $d'$, $d^2$ and $d^3$ and by opening or closing said switches 201, Fig. 3.

Such manual performance of the above designated two critical or essential steps as described above may be further refined so as to be applicable to higher rotative speeds of the output shaft D, Fig. 1. In this refinement the operator bases his manual operations on visual observation of a target disk mounted on the end of, and coaxial with, output shaft D. On this target disk are painted small circular targets, each indicating the position of a crank arm. They are distinguished from each other by colors. The operator will be in control of four switches 201, Fig. 3, one in each of the engine ignition circuits. Between the observer and the target disk is a screen so positioned as to make visible only (the upper) half of the target disk. This screen is adjustable i.e., rotatable about the axis of the shaft, by hand. The operator will keep closed those switches whose engines circuits correspond to the crank arms whose positions appear above the screen. The rotatable feature of the screen permits the operator to provide for advancement (or retardment) in the timing of the events which he controls. He may base this manual timing adjustment on his observation of an r.p.m. indicator for the shaft D. The switch controls bear colors corresponding to the colors on the target disks. The color relationship between the switches and the target disks will be changed, by hand, by a 180° phase relationship when it is desired to reverse the direction of rotation of the output shaft D, or the screen may be rotated 180°, discounting timing advancement adjustments. The ignition control switches 201 may be so related (a kind of rocker arm switch) that when a switch is closed, the switch controlling the ignition circuit of the other engine of the pair will be open by the same action.

My invention in all of the forms illustrated is characterized by its capacity for a smooth variation in the ratio of the average rotative speed of the flywheel to the rotative speed of the output shaft, and a correspondingly smooth inverse variation in the ratio of the output torque of the output shaft to the rotative speed of that shaft. Furthermore, the power transmitting connections between the flywheels and the output shaft which I have devised, are inherently simpler in construction and operation than the variable speed transmissions of the toothed gear and hydraulic types now in use for purposes for which the present invention is well adapted.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A variable speed power unit comprising in combination, an output shaft having one or more crank portions, a separate flywheel associated with each of said crank portions and comprising a weight movable toward and away from the flywheel axis, a separate engine connected to each flywheel to rotate the latter about its axis, means connecting each crank portion to the corresponding flywheel weight to move the latter toward the flywheel axis during one portion of each revolution of said shaft and to permit said weight to move away from said axis during another portion of said revolution, and engine control means responsive to changes in the angular position of said output shaft and operative to make the average rotative speed of each flywheel higher relative to the speed of said shaft during the portion of each revolution of the latter in which said flywheel weight is moving away from the flywheel axis than during the portion of said revolution in which said weight is moving toward the flywheel axis.

2. A variable speed power unit as specified in claim 1, in which the engine connected to and rotating each flywheel is an internal combustion engine, and which includes fuel supply means adjustable to vary the fuel supply to each engine and includes means responsive to the relative movement of said output shaft for adjusting the fuel means to make the fuel supply to each engine greater during the portion of each revolution of the output shaft in which the corresponding flywheel weight is moving away from the flywheel axis than during the portion of said revolution in which said weight is moving toward the flywheel axis.

3. A variable speed power unit comprising in combination, an output shaft having one or more crank portions, a separate flywheel associated with each of said crank portions and comprising a weight movable toward and away from the flywheel axis, a separate internal combustion engine connected to each flywheel to rotate the latter about its axis, means connecting each crank portion to the corresponding flywheel weight to move the latter toward the flywheel axis during one portion of each revolution of said shaft and to permit said weight to move away from said axis during a second portion of said revolution, regulatable engine fuel supply means and means responsive to changes in the angular position of said output shaft for adjusting said fuel supply means to make the average fuel supply to each engine greater during the portion of each revolution of said shaft in which the corresponding flywheel weight is moving away from the flywheel axis than during the portion of said revolution in which said weight is moving toward the flywheel axis.

4. A variable speed power unit comprising in combination, an output shaft having one or more crank portions, a separate flywheel associated with each of said crank portions and comprising a weight movable toward and away from the flywheel axis along a path substantially transverse to said axis, a separate internal combustion engine connected to each flywheel to rotate the latter about its axis, a connection between each crank portion and the associated flywheel weight through which a component of the centrifugal force acting on the weight is transmitted to said crank portion and through which the latter moves said weight toward the flywheel axis during one portion of each revolution of said shaft and opposes movement of said weight away from said axis during a second portion of said revolution, regulatable fuel supply means for each engine comprising a supply passage through which the major portion at least of the fuel supplied to the engine passes to the latter and comprising a valve adjustable between an open position in which it permits, and a closed position in which it prevents, the free flow of fuel through said passage and valve adjusting means responsive to changes in the angular position of said output shaft for maintaining said valve in its open position during a large part of said one portion and in its closed position during a large part of said second portion of each revolution of said shaft.

5. A combination as specified in claim 4, in which said valve adjusting means is adjustable to vary the respective points in each revolution of said output shaft at which said valve is opened and closed.

6. A combination as specified in claim 4, in which said valve adjusting means includes separate and independently adjustable timing devices, respectively controlling the points in each revolution of said output shaft at which said valve is opened and closed.

7. A power unit as specified in claim 1, including three or more crank portions which are uniformly spaced about the axis of said output shaft so that the associated flywheel weights collectively subject said output shaft to a continuous resultant torque tending to rotate said shaft in said predetermined direction.

8. A power unit combination as specified in claim 4, in which the fuel supply means for each engine comprises a fuel supply conduit and a valve adjustable between one position in which it permits and a second position in which it prevents substantially free fuel flow through said passage.

9. A variable speed power unit comprising in combination, an output shaft having one or more crank portions, a separate flywheel associated with each said crank portion and comprising a weight movable toward and away from the flywheel axis along a path substantially transverse to said axis, a separate internal combustion engine connected to each flywheel to rotate the latter about its axis, a connection between each crank portion and the associated flywheel weight through which a component of the centrifugal force acting on the weight is transmitted to said crank portion and through which the latter moves said weight toward the flywheel axis during one portion of each revolution of said shaft and opposes movement of said weight away from said axis during a second portion of said revolution, regulable fuel supply means for each engine comprising a main fuel supply conduit and an auxiliary fuel supply conduit and a separate valve adjustable to open and close each passage, and means operatively connecting said regulable fuel supply means in timed relation with the rotation of said shaft.

10. A variable speed power unit comprising in combination, an output shaft having one or more crank portions, a separate flywheel associated with each of said crank portions and comprising a weight movable toward and away from the flywheel axis, a separate engine connected to each flywheel to rotate the latter about its axis, a connection between each crank portion and the corresponding flywheel weight to move the latter toward the flywheel axis during one portion of each revolution of said shaft and to permit said weight to move away from said axis during another portion of said revolution, and engine control means responsive to changes in the angular position of said output shaft and operative to make the average rotative speed of each flywheel higher relative to the speed of said shaft during the central portion of each half revolution of the latter in which said flywheel weight is moving away from the flywheel axis than during any portion of similar extent of said revolution in which said weight is moving toward the flywheel axis.

11. A variable speed power unit as specified in claim 1, in which the engine connected to and rotating each flywheel is an internal combustion engine, and which includes energy supply means adjustable to vary the energy supply to each engine and includes means responsive to the rotative movement of said output shaft for adjusting said energy supply means to make the average energy supply to each engine greater during the portion of each revolution of the output shaft in which the corresponding flywheel weight is moving away from the flywheel axis than during the portion of said revolution in which said weight is moving toward the flywheel axis.

12. A variable speed power unit comprising in combination, an output shaft having one or more crank portions, a separate flywheel associated with each of said crank portions and comprising a weight movable toward and away from the flywheel axis, a separate internal combustion engine connected to each flywheel to rotate the latter about its axis, means connecting each crank portion to the corresponding flywheel weight to move the latter toward the flywheel axis during one portion of each revolution of said shaft and to permit said weight to move away from said axis during a second portion of said revolution, means continuously supplying fuel to each engine, an ignition system for each engine, and means responsive to changes in the angular position of said output shaft for rendering said ignition system inoperative during a portion of each revolution of said shaft in which each flywheel weight is moving toward the flywheel axis.

13. A variable speed power unit comprising in combination, an output shaft having one or more crank portions, a separate flywheel associated with each of said crank portions and comprising a weight movable toward and away from the flywheel axis, a separate internal combustion engine connected to each flywheel to rotate the latter about its axis, means connecting each crank portion to the corresponding flywheel weight to move the latter toward the flywheel axis during one portion of each revolution of said output shaft and to permit said weight to move away from said flywheel axis during a second portion of said revolution, regulatable means continuously supplying fuel to each engine, an ignition system for each engine, and means responsive to changes in the angular position of said output shaft for rendering said ignition system inoperative, and means for so timing the operative periods and the inoperative periods of said ignition system as to make the rotative speed of the engine greater during substantially all of that portion of each revolution of said output shaft in which the corresponding said flywheel weight is moving away from said flywheel axis than during substantially all of that portion of each revolution of said output shaft in which the corresponding said flywheel weight is moving toward said flywheel axis.

14. A variable speed power unit comprising in combination, an output shaft having one or more crank portions, a separate flywheel associated with each of said crank portions and comprising a weight movable toward and away from the flywheel axis, a separate engine connected to each flywheel to rotate the latter about its axis, means connecting each crank portion to the corresponding flywheel weight to move the latter toward the flywheel axis during one portion of each revolution of said output shaft and to permit said weight to move away from said axis during another portion of said revolution, regulatable engine fuel supply means, a second means of interrupting engine fuel supply, and means operatively connected to said output shaft for so timing the said second means of interrupting engine fuel supply as to make the rotative speed of the engine greater during substantially all of that portion of each revolution of said output shaft in which the corresponding said flywheel weight is moving away from said flywheel axis than during substantially all of that portion of each revolution of said output shaft in which the corresponding said flywheel weight is moving toward said flywheel axis.

15. A combination as specified in claim 13 in further combination with means operatively connected to said output shaft for preventing fuel waste during the said inoperative periods of the ignition system.

16. A variable speed power unit comprising in combination, an output shaft having two or more crank portions, a separate flywheel associated with each of said crank portions and comprising a weight movable toward and away from the flywheel axis, a separate internal combustion engine connected to each flywheel to rotate the latter about its axis, means connecting each crank portion to the corresponding flywheel weight to move the latter toward the flywheel axis during one portion of each revolution of said output shaft and to permit said weight to move away from said flywheel axis during a second portion of said revolution, means whereby the rate of deceleration of one of said flywheels is made to closely approximate the rate of acceleration of another of said flywheels and vice versa, regulatable means continuously supplying fuel to each engine, an ignition system for each engine, and means operatively connected to said output shaft responsive to changes in the angular position of said output shaft for rendering said ignition system inoperative, and means for so timing the operative periods and the inoperative periods of said ignition system as to make the rotative speed of the engine greater during substantially all of that portion of each revolution of said output shaft in which the corresponding said flywheel weight is moving away from said flywheel axis than during substantially all of that portion of each revolution of said output shaft in which the corresponding said flywheel weight is moving toward said flywheel axis.

17. A variable speed power unit comprising in combination, an output shaft having two or more crank portions, a separate flywheel associated with each of said crank portions and comprising a weight movable toward and away from the flywheel axis, a separate engine connected to each flywheel to rotate the latter about its axis, means connecting each crank portion to the corresponding flywheel weight to move the latter toward the flywheel axis during one portion of each revolution of said output shaft and to permit said weight to move away from said axis during a second portion of said revolution, means whereby the rate of deceleration of one of said flywheels is made to closely approximate the rate of acceleration of another of said flywheels and vice versa, regulatable engine fuel supply means, a second means of interrupting engine fuel supply, and means operatively connected to said output shaft for so timing the said second means of interrupting engine fuel supply as to make the rotative speed of the engine greater during substantially all of that portion of each revolution of said output shaft in which the corresponding said flywheel weight is moving away from said flywheel axis than during substantially all of that portion of each revolution of said output shaft in which the corresponding said flywheel weight is moving toward said flywheel axis.

18. Apparatus for rotating a crank shaft in a predetermined direction, comprising a flywheel including a weight movable toward and away from the axis of said flywheel, a connecting rod operatively connected at one end to said crank shaft and operatively connected at its other end to said flywheel, means for applying a unidirectional torque to said flywheel to maintain said weight in rotation in a given direction, means for translating the centrifugal force of said rotating weight away from the axis of said flywheel into a longitudinal force on said connecting rod in a direction away from said crank shaft so that said longitudinal force assists the rotation of said shaft during one portion of each revolution and opposes rotation during another portion of each revolution, and means for varying said torque in accordance with the angular position of said crank shaft so that the average value of said torque during said one portion of each revolution of said crank shaft is greater than the average value during said other portion of each revolution.

19. Apparatus for rotating a crank shaft in a predetermined direction, comprising a flywheel having an axis of rotation extending transversely of said shaft, said flywheel including a weight movable toward and away from said flywheel axis, connecting rod operatively connected at one end to said crank shaft and operatively connected at its other end to said flywheel, said connecting rod extending along said flywheel axis, means for applying a unidirectional torque to said flywheel to maintain said weight in rotation in a given direction, linkage means operatively connecting said weight to said connecting rod for translating the centrifugal force of said rotating weight away from the axis of said flywheel into a longitudinal force on said connecting rod in a direction away from said crank shaft so that said longitudinal force assists the rotation of said shaft during one portion of each revolution of said crank shaft and opposes rotation during another portion of each revolution of said crank shaft, and means for varying said torque in accordance with the angular position of said crank shaft so that the average value of said torque during said one portion of each revolution of said crank shaft is greater than the average value during said other portion of each revolution.

20. Apparatus for rotating a crank shaft in a predetermined direction, comprising a flywheel including a rotatable weight movable toward and away from the axis of rotation of said flywheel, means for applying a unidirectional torque to said flywheel to maintain said weight in unidirectional rotation and thus to exert a centrifugal force, a connecting rod connected at one end to said crank shaft, means connecting said connecting rod to said rotatable weight to translate said centrifugal force into a tension force on said connecting rod away from said crank shaft, whereby said tension force assists the rotation of said shaft during one portion of each revolution and opposes rotation during another portion of each revolution, and means for varying said torque applied to said flywheel in accordance with the angular position of said crank shaft so that the average value of said torque during said one portion of each revolution of said crank shaft is greater than the average value during said other portion of each revolution, whereby said tension force assisting the rotation of said crank shaft is greater than the tension force opposing said rotation.

21. Apparatus for rotating a crank shaft having a plurality of angularly related crank shaft portions, comprising a plurality of flywheels each including a rotatable weight movable toward and away from the axis of rotation of said flywheel, a plurality of means, one for each flywheel, for applying a unidirectional torque to each flywheel to maintain its weight in unidirectional rotation and thus to exert a centrifugal force, a connecting rod for each flywheel, each connecting rod being connected at one end to one of said crank shaft portions, means connecting each connecting rod at its other end to its associated rotatable weight to translate said centrifugal force into a tension force on said connecting rod away from said crank shaft, whereby said tension force assists the rotation of said shaft during one portion of each revolution and opposes rotation during another portion of each revolution, and a plurality of means, one for each of said torque applying means, for varying the torque applied to the associated flywheel in accordance with the angular position of the associated crank shaft portion so that the average value of said torque during said one portion of each revolution of said crank shaft is greater than the average value during said other portion of each revolution, whereby the tension force exerted by each connecting rod on said crank shaft to assist rotation thereof is greater than the tension force opposing rotation.

22. The method of operating an apparatus to rotate a crank shaft in a predetermined direction, said crank shaft having at least one crank portion, said apparatus including a rotatable weight mounted for movement toward and away from its axis of rotation and means operatively connecting said weight to said crank portion for translating the centrifugal force of said weight into a longitudinal tension force on said crank shaft transversely of said crank shaft; said method including the steps of supplying a unidirectional torque to said weight to rotate said weight in a given direction so that its centrifugal force will assist rotation of said shaft during one portion of each revolution and oppose rotation of said shaft during another portion of each revolution, and varying said torque so that it is greater during said one portion of each revolution of said shaft than during said other portion of each revolution.

23. A method as specified in claim 22, in which the ratio of the average angular velocity of said weight about said axis to the angular velocity of said shaft increases as the load force opposing the rotation of the crank shaft increases.

24. A method as specified in claim 22, in which the major portion of the said torque force to which the weight is subjected is applied to the latter during one half portion of the revolution of said crank portion.

25. The method of operating an apparatus to rotate a crank shaft in a predetermined direction, said crank shaft having at least one crank portion, said apparatus including a rotatable weight mounted for movement toward and away from its axis of rotation and means operatively connecting said weight to said crank portion for translating the centrifugal force of said weight into a longitudinal tension force on said crank shaft transversely of said crank shaft; said method including the steps of supplying a unidirectional torque to said weight to rotate said weight in a given direction so that its centrifugal force will assist rotation of said shaft during one portion of each revolution and oppose rotation of said shaft during another portion of each revolution, and varying said torque so that the tension force on said shaft has a greater average value during said one portion of said revolution of said shaft than during said other portion of each revolution.

26. The method of operating an apparatus to rotate a crank shaft in a predetermined direction, said crank shaft having at least one crank portion, said apparatus including a rotatable weight mounted for movement toward and away from its axis of rotation and means including a connecting rod extending transversely of said crank shaft for operatively connecting said weight to said crank portion for translating the centrifugal force of said weight into a longitudinal tension force on said crank shaft transversely of said crank shaft; said method including the step of supplying a unidirectional torque to said weight to rotate said weight in a given direction so that its centrifugal force will assist rotation of said shaft during one portion of each revolution and oppose rotation of said shaft during another portion of each revolution, and varying said torque so that said tension force on said crank shaft is greater during that portion of each revolution of said crank shaft when said connecting rod is moving away from said crank shaft than during that portion of each revolution of said crank shaft when said connecting rod moves toward said crank shaft.

27. A variable speed power unit comprising in combination, an output shaft having at least one crank portion, a separate flywheel associated with each crank portion, and including a weight movable toward and away from the flywheel axis, a separate engine connected to each flywheel to rotate the latter about its axis, means connecting each crank portion to the corresponding flywheel weight to move the latter toward the flywheel axis during one portion of each revolution of said output shaft and to permit said weight to move away from said flywheel axis during a second portion of said revolution, means for controlling the supply of energy from each of said engines to its corresponding flywheel, and means operatively connected to said output shaft and said energy supply control means for timing the supply of energy by each of said engines to effect rotation of said corresponding separate flywheel so that said tension force during that portion of each revolution of said output shaft in which said connecting rod is moving, away from said output shaft is greater than said tension force during that portion of each revolution of said output shaft in which said connecting rod is moving toward said output shaft.

28. A variable speed power unit comprising in combination, an output shaft having at least one crank portion, a separate flywheel associated with each crank portion and comprising a weight movable toward and away from the flywheel axis, a separate engine connected to each flywheel to rotate the latter about its axis, means connecting each crank portion to the corresponding flywheel weight to move the latter toward the flywheel axis during one portion of each revolution of said output shaft and to permit said weight to move away from said flywheel axis during a second portion of said revolution, means for controlling the supply of energy from each of said engines to its corresponding flywheel, means operatively connected to said output shaft and said energy supply control means for timing the energy supplied by each of said engines to effect rotation of said corresponding separate flywheel so that said tension force during that portion of each revolution of said output shaft in which said connecting rod is moving away from said output shaft is greater than said tension force during that portion of each revolution of said output shaft in which said connecting rod is moving toward said output shaft, and means operatively connected to said output shaft for predetermining the direction of rotation resulting from movement of said connecting rod away from said output shaft.

29. A variable speed power unit comprising in combination, an output shaft having at least one crank portion, a separate flywheel associated with each crank portion and comprising a weight movable toward and away from the flywheel axis, a separate engine connected to each flywheel to rotate the latter about its axis, means connecting each crank portion to the corresponding flywheel weight to move the latter toward the flywheel axis during one portion of each revolution of said output shaft and to permit said weight to move away from said flywheel axis during a second portion of said revolution, means for controlling the supply of energy from each of said engines to its corresponding flywheel, and means operatively connected to said output shaft and said energy supply control means for timing the energy supplied by each of said engines to effect rotation of said corresponding separate flywheel so that said tension force during substantially all of that portion of each revolution of said output shaft in which said connecting rod is moving away from said output shaft is greater than said tension force during substantially all of that portion of each revolution of said output shaft in which said connecting rod is moving toward said output shaft.

30. A variable speed power unit comprising in combination, an output shaft having at least one crank portion, a separate flywheel associated with each crank portion and comprising a weight movable toward and away from the flywheel axis, a separate engine connected to each flywheel to rotate the latter about its axis, means connecting each crank portion to the corresponding flywheel weight to move the latter toward the flywheel axis during one portion of each revolution of said output shaft and to permit said weight to move away from said flywheel axis during a second portion of said revolution, means for controlling the supply of energy from each of said engines to its corresponding flywheel, means operatively connected to said output shaft and to said energy supply control means for timing the energy supplied by each of said engines to effect rotation of said corresponding separate flywheel so that said tension force during substantially all of that portion of each revolution of said output shaft in which said connecting rod is moving away from said output shaft is greater than said tension force during substantially all of that portion of each revolution of said output shaft in which said connecting rod is moving toward said output shaft, and means operatively connected to said output shaft for predetermining the direction of rotation resulting from movement of said connecting rod away from said output shaft.

References Cited in the file of this patent
FOREIGN PATENTS 102,696    Austria _____ Mar. 10, 1926